United States Patent [19]

Koda et al.

[11] Patent Number: 5,295,228
[45] Date of Patent: * Mar. 15, 1994

[54] LEARNING MACHINE WITH A HIERARCHIAL STRUCTURE WITHOUT MUTUAL CONNECTIONS WITHIN LEVELS THEREOF

[75] Inventors: Toshiyuki Koda, Takatsuki; Yasuharu Shimeki, Suita; Shigeo Sakaue, Takarazuka; Hiroshi Yamamoto, Katano, all of Japan

[73] Assignee: Matsushita Electric Industrial Co., Ltd., Osaka, Japan

[ * ] Notice: The portion of the term of this patent subsequent to Jul. 7, 2009 has been disclaimed.

[21] Appl. No.: 754,517

[22] Filed: Sep. 4, 1991

[30] Foreign Application Priority Data

Sep. 4, 1990 [JP] Japan .................................. 2-234287

[51] Int. Cl.$^5$ ............................................ G06F 15/18
[52] U.S. Cl. ..................................................... 395/23
[58] Field of Search ..................................... 395/23, 24

[56] References Cited

U.S. PATENT DOCUMENTS 4,912,652  3/1990  Wood .................................. 364/513
5,129,038  7/1992  Kohda et al. ......................... 395/23

OTHER PUBLICATIONS

Luenberger, D. G.; Introduction to Linear and Nonlinear Programming, Addison-Wesley Pub. Co., 1984, 243-244.
Rumelhart et al., Parallel Distributed Processing, vol. 1, Foundations, MIT Press, 1986, 318-362.
Dahl, E. D.; "Accelerated Learning Using the Generalized Delta Rule", IEEE First Intl. Con. on Neural Networks, Jun. 1987, II-523-II-530.
Parker, D. B.; "Optimal Algorithms for Adaptive Networks: Second Order Back Propagation, Second Order Direct Propagations, and Second Order Hebbian Learning" IEEE First Intl. Conf. on Neural Networks, Jun. 2, 1987, II593-II600.
Watrous, R. L.; "Learning Algorithms for Connectionist Networks; Applied Gradient Methods of Nonlinear Optimization", IEEE Intl. Conf. on Neural Networks, Jun. 1987, II-619-II-627.
Cater, J. P.; "Successfully Using Peak Learning Rates of 10 (and greater) in Back-propagation Networks with the Heuristic Learning Algorithm", IEEE First Intl. Conf. on Neural Networks, Jun. 1987, II-645-II-651.
Hush et al., "Improving the Learning Rate of Back-Propagation with the Gradient Reuse Algorithm", IEEE Intl. Conf. in Neural Networks, Jul. 1988, I-44-1-I-446.
Woods, D.; "Back and Counter Propagation Abberations", IEEE Intl. Conf. on Neural Networks, Jul. 1988, I-473-I-479.
Vogl et al., "Accelerating the Convergence of the Back-Propagation Method", Biological Cybernetics, 59, Spring 1988, 257-263.
Barnard et al., "A Comparison between Criterion Functions for Linear Classifiers, with an Application to Neural Nets", IEEE Trans. Syst., Man, and Cybernetics, Sep./Oct. 1989, 1030-1041.

(List continued on next page.)

*Primary Examiner*—Michael R. Fleming
*Assistant Examiner*—Robert W. Downs
*Attorney, Agent, or Firm*—Wenderoth, Lind & Ponack

[57] ABSTRACT

A learning machine has plural multiple-input single-output signal processing circuits connected in a hierarchical structure. The learning machine sets a threshold value, which is a evaluation standard for change in weight coefficients, high during the early part of the learning process and enables rough learning to progress without changing the weight coefficients for those multiple-input single-output signal processing circuits for which errors are sufficiently small. On the other hand, the learning machine gradually reduces the threshold value as learning progresses and advances learning by a non-linear optimization method (including a conjugate gradient method, a linear search method, or a combination of conjugate gradient and linear search methods) during the later part of the learning process, and thereby improves the learning speed.

6 Claims, 11 Drawing Sheets

OTHER PUBLICATIONS

Kramer et al., "Efficient Parallel Learning Algorithms for Neural Networks", in Advances in Neural Information Processsing Systems I, 1989, 40–48.

Huang et al., "Learning Algorithms for Perceptrons Using Back–Propagation with Selective Updates", IEEE Control Systems Magazine, Apr. 1990, 56–61.

Yan et al., "Weight Adjustment Rule of Neural Networks for Computing Discrete 2-D Gabor Transforms", IEEE Trans. ASSP, Sep. 1990, 1654–1656.

Battiti, R.; "First- and Second–Order Methods for Learning: Between Steepest Descent and Newton's Method," Neural Computation 4, Mar. 1992, 1 41–166.

Yu, et al., "Training Algorithms for Back Propagation Neural Networks with Optimal Descent Factor," Electronics Letters, Sep. 1990, 1698–1700.

LEARNING MACHINE WITH A HIERARCHIAL STRUCTURE WITHOUT MUTUAL CONNECTIONS WITHIN LEVELS THEREOF

BACKGROUND OF THE INVENTION

This invention relates to a learning machine capable of learning by means of a hierarchical structure without mutual connections within levels thereof, and having plural multiple-input single-output signal processors connected in a network structure in such a manner that signals propagate only to a higher level.

A conventional learning machine has been described by D. E. Rumelhart, G. E. Hinton, and R. J. Williams in their article "Learning Representations by Back-Propagating Errors" in the Oct. 9, 1986 issue of Nature (vol. 323, pp. 533–536).

FIG. 8 shows a structure of a conventional learning machine. As shown in the block diagram of FIG. 8, this conventional learning machine comprises an output signal calculator 1 and a weight coefficient renewer 2 which renews the value of the weight coefficient of the output signal calculator 1 based on the output signal obtained therefrom. The output signal calculator 1 is a multiple stage circuit network as shown in FIG. 9 comprising plural multiple-input single-output signal processors 3 and plural input means 4. A specific example of the multiple-input single-output signal processor 3 used in this output signal calculator 1 is shown in FIG. 10. As shown in FIG. 10, each multiple-input single-output signal processor 3 comprises plural input 5, a memory 6 to store the weight coefficients which weight the plural inputs from the inputs 5, plural multipliers 7 which multiply the weight coefficients from the memory 6 by the inputs from the inputs 5, an adder 8 which adds the outputs from each of the multipliers 7, and a threshold value processor 9 which limits the output from the adder 8 to a value within a predetermined range. The input/output characteristics of the threshold value processor 9 are shown in FIG. 11.

For example, the input/output characteristics of the threshold value processor 9 which limits the output to a value within the range of (0, 1) can be numerically expressed as $$f(I) = 1/(1+\exp(-I+\theta)).$$

It is to be noted that the weight coefficient renewer 2 shown in FIG. 8 comprises a teacher signal generator 10, an error signal calculator 11, a steepest descent direction determination means 12, an amount of weight change calculator 13, and a weight modifier 14.

A conventional learning machine constructed as described above operates as described below.

When an input signal is input to the input section 4 of the output signal calculator 1, each of the multiple-input single-output signal processors 3 multiplies the output of each of the lower level multiple-input single-output signal processors 3 connected thereto by a weight coefficient, which represents the significance of the connection and is stored in the memory 6, by means of the multipliers 7 and then obtains the sum of the outputs from the multipliers 7 by means of the adder 8; this sum is converted by the threshold value processor 9 and the resulting value is output to the multiple-input single-output signal processors 3 one level higher. In other words, the multiple-input single-output signal processor 3 shown in FIG. 10 processes the equation $$o_i = f(\Sigma_j w_{ij} o_j)$$

where $o_j$ is the input value to the input means 5 (the output of the lower level multiple-input single-output signal processor at position j) and $w_{ij}$ is the weight coefficient stored in the memory 6 (the connection weight of the i position multiple-input single-output signal processor to the lower level j position multiple-input single-output signal processor). FIG. 11 is a graph of the input/output characteristics of a function f which expresses a threshold value process of the multiple-input single-output signal processor 3, wherein I in FIG. 11 is the input value to the threshold value processor 9.

The teacher signal generator 10 in the weight coefficient renewing means 2 generates a desirable output signal for the number p input signal input from the input section 4 of the output signal calculator 1; this output signal is used as the teacher signal $t_{pk}$ (where $t_{pk}$ expresses the teacher signal for the output of the number k multiple-input single-output signal processor in the highest level of the output signal calculation means 1). The error signal calculator 11 then obtains the error from the difference between the teacher signal $t_{pk}$ and the actual output signal $o_{pk}$ to the number p input signal output from the output signal calculation means 1 (where $o_{pk}$ expresses the output of the number k multiple-input single-output signal processor in the highest level of the output signal calculation means 1) using the equation $$E = 0.5\Sigma_p\Sigma_k (t_{pk} - o_{pk})^2 \qquad (1)$$
$$= E(\vec{W})$$

and applies this value to evaluate the performance of the network at the present connection state (weight coefficient value). In equation (1), $\Sigma_p$ is the sum for all input signals, $\Sigma_k$ is the sum of the outputs of all multiple-input single-output signal processors in the highest level of the output signal calculator 1, and W is a vector which has the weight coefficient $W_{ij}$ as each component, and which hereinafter is called a weight vector. The error E becomes a function of the weight vector $\vec{W}$. Furthermore, the teacher signal $t_{pk}$ is a value of either 0 or 1.

Based on the obtained error E, the steepest descent direction determination means 12 computes $$\vec{g} = \partial E / \partial \vec{W} \qquad (2)$$

to obtain the direction of steepest descent, which is the direction of change of the weight vector of the output signal calculator 1. The direction of steepest descent is a vector of which a component is a differential of the error E to the weight coefficient $W_{ij}$.

The amount of weight change calculator 13 obtains the amount of change in the weight vector of the output signal calculator from this direction of steepest descent by the equation $$\Delta\vec{W} = -\epsilon \cdot \partial E/\partial\vec{W} + \alpha \cdot \Delta\vec{W}' \qquad (3)$$

where $\epsilon$ is a positive constant called the learning rate, $\alpha$ is a positive constant called the acceleration parameter, and $\Delta\vec{W}'$ is the amount of change in the weight vector in the previous learning cycle. The weight modification means 14 changes the weight vector of the output signal calculation means according to the amount of change in the weight vector. The amount of error is reduced by thus repeatedly renewing the weight, and when the error is sufficiently small, it is concluded that the output signal is sufficiently close to the desired value and learning stops.

Because learning is accomplished by minimizing the sum square error E in the conventional learning machine as described above, the weights of multiple-input single output signal processors are simply changed while an error for each of the multiple-input single-output signal processors becomes sufficiently small, if a total error, which is expressed as the total sum square error, decreases, even if another multiple-input single-output signal processor with a large error remains; thus, learning efficiency deteriorates.

Furthermore, minimizing of the sum square error is not limited to changing the weight so that the error of the multiple-input single-output signal processor with the greatest error is reduced, and if the error of only some of the multiple-input single-output signal processors in the highest level remains extremely high without converging and yet the block causing this high error is biased towards the multiple-input single-output signal processors which should output "1" (the teacher signal=1), the convergence speed thereof will deteriorate compared with the multiple-input single-output signal processors which should output "0" (teacher signal=0).

Therefore, the problem exists with the conventional learning machine as described above that the time required for learning becomes greater.

SUMMARY OF THE INVENTION

Therefore, an object of the present invention is to provide a learning machine which requires a short period of time for learning.

To achieve the aforementioned object, a learning machine of a first embodiment of the present invention comprises an output signal calculator comprising plural multiple-input single-output signal processors network connected in a hierarchical structure without mutual connections within levels in such a manner that signals propagate only to a higher level, and a weight coefficient renewer which renews values of weight coefficients of the output signal calculator based on output signals obtained by the output signal calculator;

each multiple-input single-output signal processor comprising a memory to store plural weight coefficients, an input section for inputting plural data, multiplier to weight the input data from the input section by the weight coefficients stored in the memory, an adder to add the plural data weighted by the multiplier, and a threshold value processor to limit an output of the adder to a value within a predetermined range; and the weight coefficient renewer comprising a teacher signal generator to produce as a teacher signal a desirable value for the output signal of the output signal calculator, an error signal calculator to obtain an error between the output signal and the teacher signal, a steepest descent direction determinator to obtain a direction of steepest descent from an output of the error signal calculator;

the weight coefficient renewer further comprising a conjugate gradient direction determinator to obtain a direction of a conjugate gradient from the direction of steepest descent, a learning progress evaluation means to evaluate progress of learning from the error output from the error signal calculator, a threshold value controller which gradually reduces a threshold value as learning progresses according to an evaluation result of the learning progress evaluator, a first error signal evaluation means which evaluates whether the output of the error signal calculator is less than the threshold value of the threshold value controller, a weight change direction selector which selects either the direction of the conjugate gradient or the direction of the steepest descent as a direction of weight change according to the level of the threshold value, an amount of weight change calculator which calculates an amount of change in the weight coefficient from the selected direction of weight change, a first amount of weight change controller which sets the amount of weight coefficient change to 0 when the error is determined to be less than the threshold value by the first error signal evaluator, and a weight modifier which changes the value of the weight coefficient stored in the memory according to an output of the amount of weight change calculator.

A learning machine of a second embodiment of the present invention comprises an output signal calculator comprising plural multiple-input single-output signal processor networks connected in a hierarchical structure without mutual connections within levels in such a manner that signals propagate only to a higher level, and a weight coefficient renewer which renews values of weight coefficients of the output signal calculator based on output signals obtained by the output signal calculator;

each multiple-input single-output signal processor comprising a memory to store plural weight coefficients, an input section for inputting plural data, multiplier to weight the input data from the input section by the weight coefficients stored in the memory, an adder to add the plural data weighted by the multiplier, and a threshold value processor to limit an output of the adding means to a value within a predetermined range; and the weight coefficient renewer comprising a teacher signal generator to produce as a teacher signal a desirable value for the output signal of the output signal calculator, an error signal calculator to obtain an error between the output signal and the teacher signal, a steepest descent direction determinator to obtain a direction of steepest descent from an output of the error signal calculator;

the weight coefficient renewer further comprising an amount of weight change calculator which calculates an amount of change in the weight coefficient from the direction of steepest descent, a linear searcher which outputs amounts of weight change to plural learning rates for the direction of steepest descent, a parabolic line approximator which determines an amount of weight change by parabolic line approximation method from the plural weight change amounts output from the linear searcher, a learning progress evaluator evaluates progress of learning from the error output by the error signal calculator, a threshold value controller which gradually reduces a threshold value as learning progresses according to an evaluation result of the learning progress evaluator, a first error signal evaluation means which evaluates whether the output of the error signal calculator is less than the threshold value of the threshold value controller, a first amount of weight change controller which sets the amount of weight coefficient change to 0 when the error is determined to be less than the threshold value by the first error signal evaluator, an amount of weight change selector which selects either an output of the amount of weight change calculator or an output of the parabolic line approximator according to the level of the threshold value, and a weight modifier which changes the value of the weight coefficient stored in the memory according to an amount of weight change selected by the amount of weight change selector.

A learning machine of a third embodiment of the present invention comprises an output signal calculator comprising plural multiple-input single-output signal processors network connected in a hierarchical structure without mutual connections within levels in such a manner that signals propagate only to a higher level, and a weight coefficient renewer which renews values of weight coefficients of the output signal calculator based on output signals obtained by the output signal calculator;

each multiple-input single-output signal processor comprising a memory to store plural weight coefficients, an input section for inputting plural data, multiplier to weight the input data from the input section by the weight coefficients stored in the memory, an adder to add the plural data weighted by the multiplier, and a threshold value processor to limit an output of the adder to a value within a predetermined range; and the weight coefficient renewer comprising a teacher signal generator to produce as a teacher signal a desirable value for the output signal of the output signal calculator, an error signal calculator to obtain an error between the output signal and the teacher signal, a steepest descent direction determinator to obtain a direction of steepest descent from an output of the error signal calculator;

the weight coefficient renewer further comprising an amount of weight change calculator which calculates an amount of change in the weight coefficient from the direction of steepest descent, a conjugate gradient direction determinator to obtain a direction of the conjugate gradient from the direction of steepest descent, a linear searcher which outputs amounts of weight change to plural learning rates for the direction of the conjugate gradient, a parabolic line approximator which determines an amount of weight change by parabolic line approximation method from the plural weight change amounts output from the linear searcher, a learning progress evaluator which evaluates progress of learning from the error output by the error signal calculator, a threshold value controller which gradually reduces a threshold value as learning progresses according to an evaluation result of the learning progress evaluator, a first error signal evaluator which evaluates whether the output of the error signal calculator is less than the threshold value, a first amount of weight change controller which sets the amount of weight coefficient change to 0 when the error is determined to be less than the threshold value by the first error signal evaluator, an amount of weight change selector which selects either an output of an amount of weight change calculator or an output of the parabolic line approximator according to the level of the threshold value, and a weight modifier which changes the value of the weight coefficient stored in the memory according to an amount of weight change selected by the amount of weight change selector.

A learning machine of a fourth embodiment of the present invention comprises an output signal calculator comprising plural multiple-input single-output signal processors network connected in a hierarchical structure without mutual connections within levels in such a manner that signals propagate only to a higher level, and a weight coefficient renewer which renews values of weight coefficients of the output signal calculator based on output signals obtained by the output signal calculator;

each multiple-input single-output signal processor comprising a memory to store plural weight coefficients, an input section for inputting plural data, multiplier to weight the input data from the input section by the weight coefficients stored in the memory, an adder to add the plural data weighted by the multiplier, and a threshold value processor to limit an output of the adder to a value within a predetermined range; and the weight coefficient renewer comprising a teacher signal generator to produce as a teacher signal a desirable value for the output signal of the output signal calculator, an error signal calculator to obtain an error between the output signal and the teacher signal, a steepest descent direction determinator to obtain a direction of steepest descent from an output of the error signal calculator;

the weight coefficient renewer further comprising a conjugate gradient direction determinator to obtain a direction of a conjugate gradient from the direction of steepest descent, a learning progress evaluator which evaluates progress of learning from the error output by the error signal calculator, a threshold value controller which gradually reduces a threshold value as learning progresses according to an evaluation result of the learning progress evaluator, a first error signal evaluator which evaluates whether the output of the error signal calculator is less than the threshold value, a skip evaluator which counts the outputs of the first error signal evaluator and outputs a skip signal when all output signals are less than the threshold value, a weight change direction selector which selects either the direction of the conjugate gradient or the direction of the steepest descent as the direction of weight change according to the level of the threshold value, an amount of weight change calculator which calculates an amount of change in the weight coefficient from the selected direction of weight change, a weight modification means which changes the value of the weight coefficient stored in the memory according to the output of the amount of weight change calculator, and a weight change controller which causes the weight modifier to skip a weight change operation according to the skip signal.

A learning machine of a fifth embodiment of the present invention comprises an output signal calculator comprising plural multiple-input single-output signal processor network connected in a hierarchical structure without mutual connections within levels in such a manner that signals propagate only to a higher level, and a weight coefficient renewer which renews values of weight coefficients of the output signal calculator based on output signals obtained by the output signal calculator;

each multiple-input single-output signal processor comprising a memory to store plural weight coefficients, an input section for inputting plural data, multiplier to weight the input data from the input section by the weight coefficients stored in the memory, an adder to add the plural data weighted by the multiplier, and a threshold value processor to limit an output of the adder to a value within a predetermined range; and the weight coefficient renewer comprising a teacher signal generator to produce as a teacher signal a desirable value for the output signal of the output signal calculator, an error signal calculator to obtain an error between the output signal and the teacher signal, a steepest descent direction determinator to obtain a direction of steepest descent from an output of the error signal calculator;

the weight coefficient renewer further comprising an amount of weight change calculator which calculates an amount of change in the weight coefficient from the direction of steepest descent, a linear searcher which outputs amounts of weight change to plural learning rates for the direction of steepest descent, a parabolic line approximator which determines an amount of weight change by parabolic line approximation method from the plural weight change amounts output from the linear searcher, a learning progress evaluator which evaluates progress of learning from the error output by the error signal calculator, a threshold value controller which gradually reduces the threshold value as learning progresses according to an evaluation result of the learning progress evaluator, a first error signal evaluator which evaluates whether the output of the error signal calculator is less than the threshold value, a skip evaluator which counts the outputs of the first error signal evaluator and outputs a skip signal when all output signals are less than the threshold value, an amount of weight change selector which selects either an output of the amount of weight change calculator or an output of the parabolic line approximation according to the level of the threshold value, a weight modifier which changes the value of the weight coefficient stored in the memory according to an amount of weight change selected by the amount of weight change selector, and a weight change controller which causes the weight modifier to skip a weight change operation according to the skip signal.

A learning machine of a sixth embodiment of the present invention comprises an output signal calculator comprising plural multiple-input single-output signal processor network connected in a hierarchical structure without mutual connections within levels in such a manner that signals propagate only to a higher level, and a weight coefficient renewer which renews values of weight coefficients of the output signal calculator based on output signals obtained by the output signal calculator;

each multiple-input single-output signal processor comprising a memory to store plural weight coefficients, an input section for inputting plural data, multiplier to weight the input data from the input section by the weight coefficients stored in the memory, an adder to add the plural data weighted by the multiplier, and a threshold value processor to limit an output of the adder to a value within a predetermined range; and the weight coefficient renewer comprising a teacher signal generator to produce as a teacher signal a desirable value for the output signal of the output signal calculator, an error signal calculator to obtain an error between the output signal and the teacher signal, a steepest descent direction determinator to obtain a direction of steepest descent from an output of the error signal calculator;

the weight coefficient renewer further comprising an amount of weight change calculator which calculates an amount of change in the weight coefficient from the direction of steepest descent, a conjugate gradient direction determinator to obtain a direction of the conjugate gradient from the direction of steepest descent, a linear searcher which outputs amounts of weight change to plural learning rates for the direction of the conjugate gradient, a parabolic line approximator which determines an amount of weight change by a parabolic line approximation method from the plural weight change amounts output from the linear searcher, a learning progress evaluator which evaluates learning progress from the error output by the error signal calculator, a threshold value controller which gradually reduces a threshold value as learning progresses according to an evaluation result of the learning progress evaluator, a first error signal evaluator which evaluates whether the output of the error signal calculator is less than the threshold value, a skip evaluator which counts outputs of the first error signal evaluator and outputs a skip signal when all output signals are less than the threshold value, an amount of weight change selector which selects either an output of the amount of weight change calculator or an output of the parabolic line approximator according to the level of the threshold value, a weight modifier which changes the value of the weight coefficient stored in the memory according to an amount of weight change selected by the amount of weight change selector, and a weight change controller which causes the weight modification means to skip a weight change operation according to the skip signal.

BRIEF DESCRIPTION OF THE DRAWINGS

The present invention will become more fully understood from the detailed description given hereinbelow and the accompanying drawings which are given by the way of illustration only, and thus are not limitative to the present invention, and wherein.

DETAILED DESCRIPTION OF THE PREFERRED EMBODIMENTS

Figure 1:
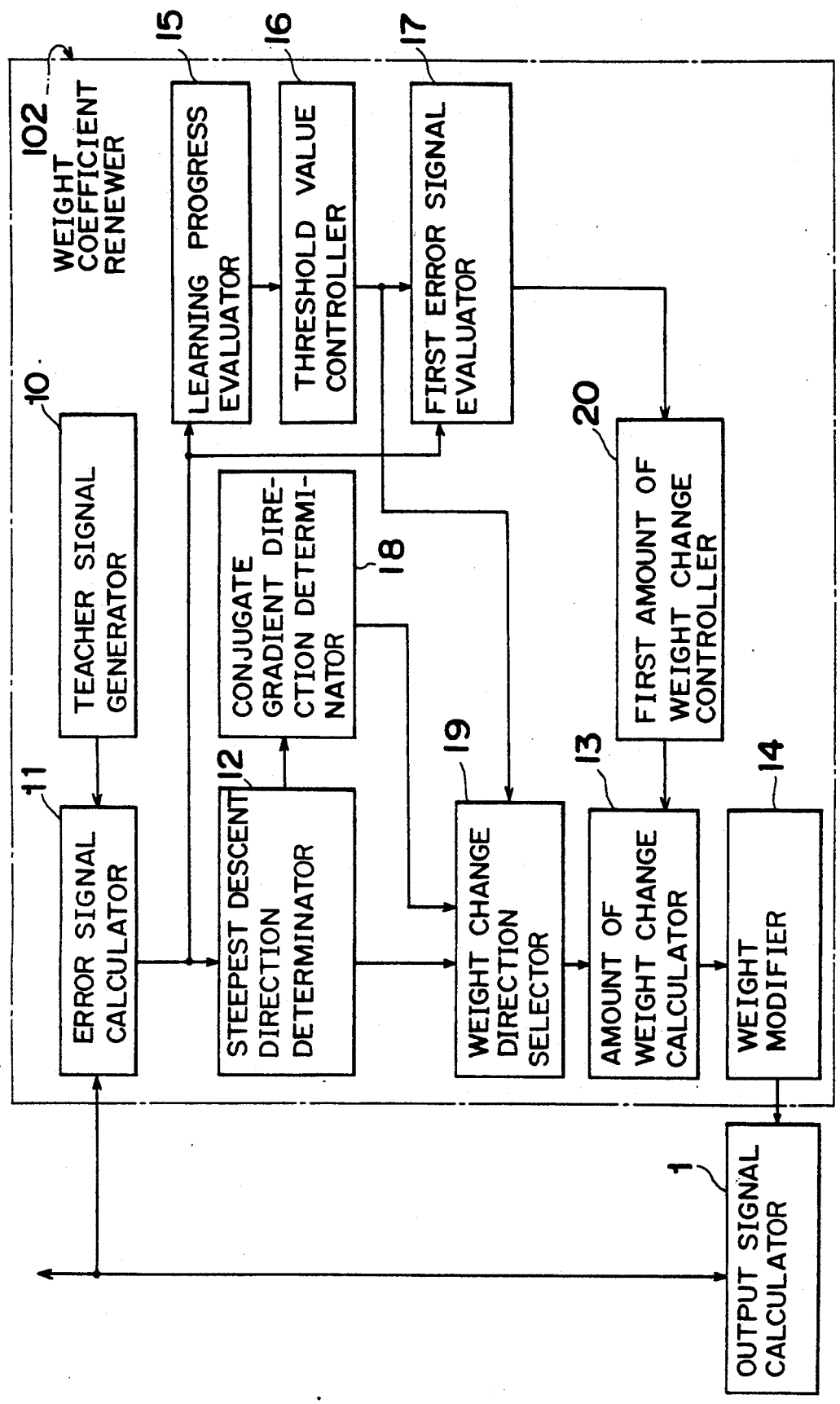
FIG. 1 is a block diagram of a learning machine according to a first embodiment of the present invention.

Before the description of the present invention proceeds, it is to be noted that like parts are designated by like reference numerals throughout the accompanying drawings.

FIG. 1 is a block diagram of a first embodiment of a learning machine according to the present invention. As shown in FIG. 1, this learning machine comprises a output signal calculator 1 and a weight coefficient renewer 102. The weight coefficient renewer 102 includes a teacher signal generator 10, an error signal calculator 11, a steepest descent direction determinator 12, an amount of weight change calculator 13, and a weight modifier 14. Each of the output signal calculator 1, the teacher signal generator 10, the error signal calculator 11, the steepest descent direction determinator 12, the amount of weight change calculator 13, and the weight modifier 14 is the same as the corresponding components of the conventional learning machine described hereinabove. In addition, the weight coefficient renewer 102 includes a learning progress evaluator 15, a threshold value controller 16, a first error signal evaluator 17, a conjugate gradient direction determinator 18, a weight change direction selector 19, and a first amount of weight change controller 20.

The operation of the learning machine according to the above first embodiment of the present invention is described hereinbelow.

As in the conventional learning machine described above, the output signal calculator 1 calculates an output signal, and the error signal calculator 11 calculates an error E by applying the equation (1) to this output signal and the output from the teacher signal generator 10. Based on this calculated error E, the steepest descent direction determinator 12 computes $$\vec{g} = \partial E / \partial \vec{W} \quad (2)$$

to obtain the direction of steepest descent, which is the direction of change of the weight vector of the output signal calculator 1.

The conjugate gradient direction determinator 18 calculates a conjugate gradient direction from the direction of steepest descent using the equation $$\vec{d} = \vec{g} + \beta \cdot \vec{d'} \quad (4)$$

where $\beta$ is a constant defined as $$\beta = |\vec{g}|^2 / |\vec{g'}|^2 \quad (5)$$

$\vec{d'}$ is a conjugate gradient direction obtained from the previous learning cycle, and $|\vec{g'}|$ is the norm of the direction of steepest descent obtained from the previous learning cycle. It is to be noted that the direction of weight change in the first learning cycle is determined to be the direction of steepest descent.

The threshold value controller 16 switches a threshold value T1 to a smaller value as learning progresses based on the evaluated result of learning progress output by the learning progress evaluator 15. The learning progress evaluator 15 evaluates the progress of the learning operation using a variety of means, including evaluating the sum of errors of the multiple-input single-output signal processors 3 in the highest level of the output signal calculator 1, by referencing the number of learning cycles, by counting the number of multiple-input single-output signal processors outputting an error greater than the threshold value in the highest level of the output signal calculator 1, and by applying the maximum value in one learning cycle of the error signal calculator 11.

The weight change direction selector 19 selects either the direction of steepest descent or the direction of the conjugate gradient according to the threshold value T1 from the threshold value controller 16, and outputs the result to the amount of weight change calculator 13. For example, the weight change direction 1 selector 19 may select the direction of steepest descent for the first part of the learning cycle and the direction of the conjugate gradient for the later part of the learning cycle. If the selected direction of weight change is the direction of steepest descent, the amount of weight change calculator 13 calculates the amount of change in the weight vector of the output signal calculator 1 from the following equation $$\Delta \vec{W} = -\epsilon \cdot \vec{g} + \alpha \cdot \Delta \vec{W'} \quad (3)$$

where $\epsilon$ is a positive constant called the learning rate, $\alpha$ is a positive constant called the acceleration parameter, and $\Delta \vec{W'}$ is the amount of change in the weight vector in the previous learning cycle. However, if the selected direction of weight change is the direction of the conjugate gradient, the amount of change in the weight vector is calculated from the following equation $$\Delta \vec{W} = -\epsilon \cdot \vec{d} \quad (6).$$

At this time the first amount of weight change controller 20 sets to "0" the amount of change in the weight coefficient of the multiple-input single-output signal processors 3 in the highest level of the output signal calculator 1 for which the error $|t_{pk} - o_{pk}|$ is evaluated by the first error signal evaluator 17 to be smaller than the threshold value T1 set by the threshold value controller 16. The weight modifier 14 changes the weight vector of the output signal calculator 1 based on this calculated change in the weight vector.

The amount of error is thus reduced by repeatedly renewing the weight, and when the error is sufficiently small, it is concluded that the output signal is sufficiently close to the desired value and learning stops.

Thus, learning efficiency is improved and the time required for learning is shortened because not only is the weight not changed for multiple-input single-output signal processors of which the error is less than a threshold value T1, but also the threshold value T1 which is the evaluation standard for whether the weight is changed is reduced as learning progresses, thereby enabling learning to progress in approximate degrees during the early learning process and gradually increasing precision as learning progresses. Moreover, because the direction of weight change is set to the direction of steepest descent, which is locally the most efficient, during the early learning process and is set to the direction of the conjugate gradient, which is generally the most efficient, during the later learning process to change the weight, learning efficiency improves and the time required for learning is shortened.

Figure 2:
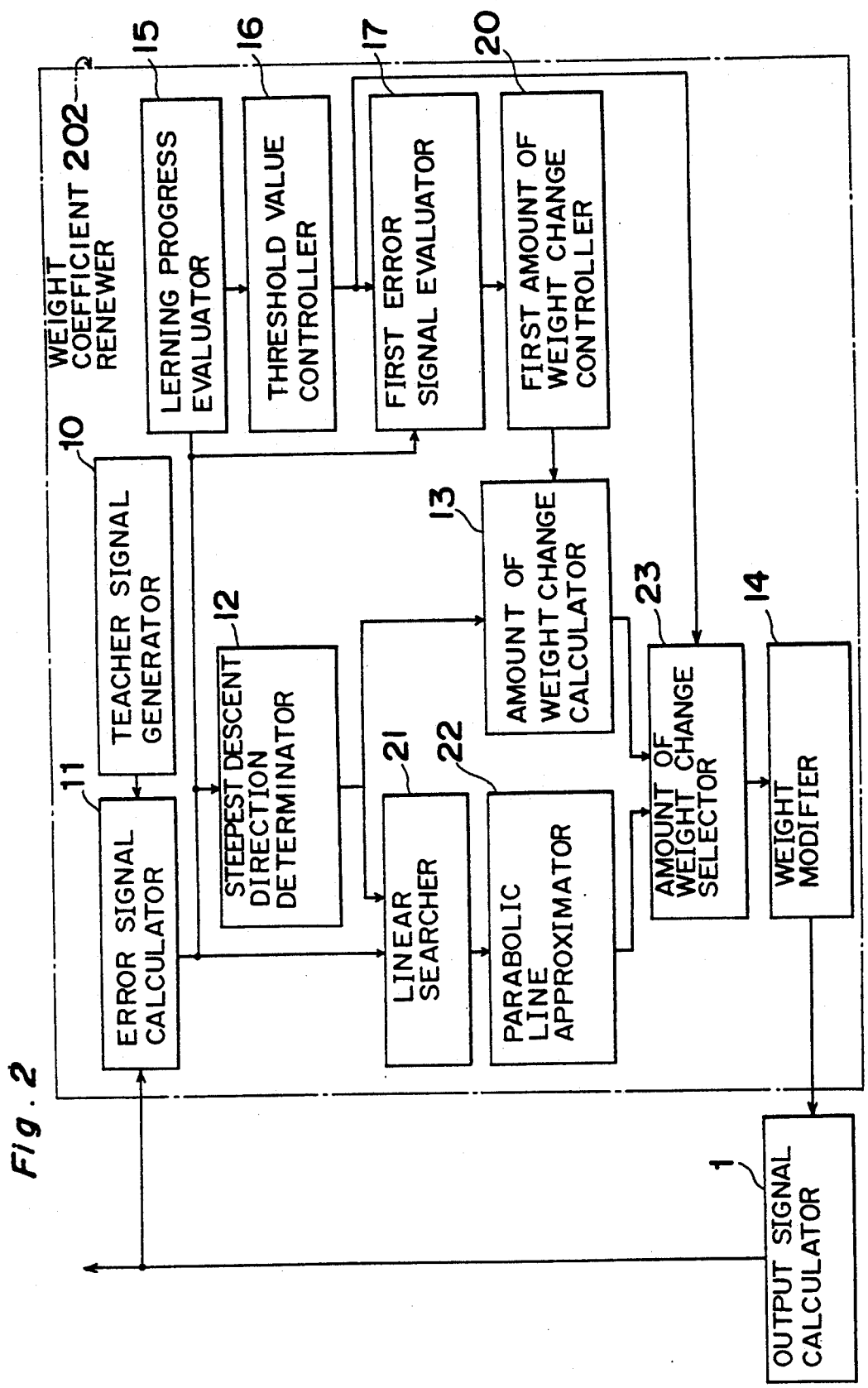
FIG. 2 is a block diagram of a learning machine according to a second embodiment of the present invention.

FIG. 2 is a block diagram of a second embodiment of a learning machine according to the present invention.

As shown in FIG. 2, this learning machine comprises an output signal calculator 1 and a weight coefficient renewer 202. The weight coefficient renewer 202 includes a teacher signal generator 10, an error signal calculator 11, a steepest descent direction determinator 12, an amount of weight change calculator 13, and a weight modifier 14. Each of the output signal calculator 1, the teacher signal generator 10, the error signal calculator 11, the steepest descent direction determinator 12, the amount of weight change calculator 13, and the weight modifier 14 is the same as the corresponding components of the conventional learning machine described hereinabove. In addition, the weight coefficient renewer 202 includes a learning progress evaluator 15, a threshold value controller 16, a first error signal evaluator 17, a first amount of weight change controller 20, a linear searcher 21, a parabolic line approximator 22, and an amount of weight change selector means 23.

The operation of the learning machine as described hereinabove is described hereinbelow.

As in the conventional learning machine described above, the output signal calculator 1 calculates an output signal, and the error signal calculator 11 calculates an error E by applying the equation (1) to this output signal and the output from the teacher signal generator 10. Based on this calculated error E, the steepest descent direction determinator 12 computes $$g = \partial E / \partial W \qquad (2)$$

to obtain the direction of steepest descent, which is the direction of change of the weight vector of the output signal calculator 1.

The amount of weight change calculator 13 calculates the amount of change in the weight vector of the output signal calculator 1 from the direction of steepest descent using the following equation $$\Delta W = -\epsilon^* g + \alpha^* \Delta \overline{W}' \qquad (3)$$

where $\epsilon$ is a positive constant called the learning rate, $\alpha$ is a positive constant called the acceleration parameter, and $\Delta \overline{W}'$ is the amount of change in the weight vector in the previous learning cycle.

At this time the first amount of weight change controller 20 sets to "0" the amount of change in the weight coefficient of the multiple-input single-output signal processors 3 in the highest level of the output signal calculator 1 for which the error $|t_{pk} - o_{pk}|$ is evaluated by the first error signal evaluator 17 to be smaller than a threshold value T1 set by the threshold value controller 16. It is to be noted that the threshold value controller 16 switches the threshold value T1 to a smaller value as learning progresses based on the evaluated result of learning progress output by the learning progress evaluator 15. The learning progress evaluator 15 evaluates the progress of the learning operation using a variety of means, including evaluating the sum of errors of the multiple-input single-output signal processors 3 in the highest level of the output signal calculator 1, by referencing the number of learning cycles, by counting the number of multiple-input single-output signal processors outputting an error greater than the threshold value T1 in the highest level of the output signal calculator 1, and by applying the maximum value in one learning cycle of the error signal calculator 11.

The linear searcher 21 calculates the amount of weight change to plural learning rates for the direction of steepest descent, and the parabolic line approximator 22 approximates the parabolic line of an error curve from the values of errors to learning rates with low error values, and after selecting the amount of weight change at which the error is lowest, outputs this to the amount of weight change selector 23.

The amount of weight change selector 23 selects either the amount of weight change calculated from the direction of steepest descent or the amount of weight change determined by the parabolic line approximation from among the weight change amounts calculated from the plural learning rates for the direction of steepest descent according to the threshold value T1, and outputs the result to the weight modifier 14. For example, the amount of weight change selector 23 may select the amount of weight change calculated from the direction of steepest descent during the early learning process, and select the amount of weight change determined by the parabolic line approximator 22 from among the weight change amounts calculated from the plural learning rates for the direction of steepest descent during the later learning process.

The weight modifier 14 thus changes the weight vector of the output signal calculator 1 based on the calculated amount of change for the weight vector.

The amount of error is thus reduced by repeatedly renewing the weight, and when the error is sufficiently small, it is concluded that the output signal is sufficiently close to the desired value and learning stops.

Thus, learning efficiency is improved and the time required for learning is shortened because not only is the weight not changed for multiple-input single-output signal processors of which the error is less than a threshold value T1, but also the threshold value T1 which is the evaluation standard for whether the weight is changed is reduced as learning progresses, thereby enabling learning to progress in approximate degrees during the early learning process and gradually increasing precision as learning progresses. Moreover, because the amount of weight change calculated from the direction of steepest descent is selected during the early learning process, and the amount of weight change determined by the parabolic line approximator 22 from among the weight change amounts calculated from the plural learning rates for the direction of steepest descent is selected during the later learning process, and the weight is changed, learning efficiency improves and the time required for learning is shortened.

Figure 3:
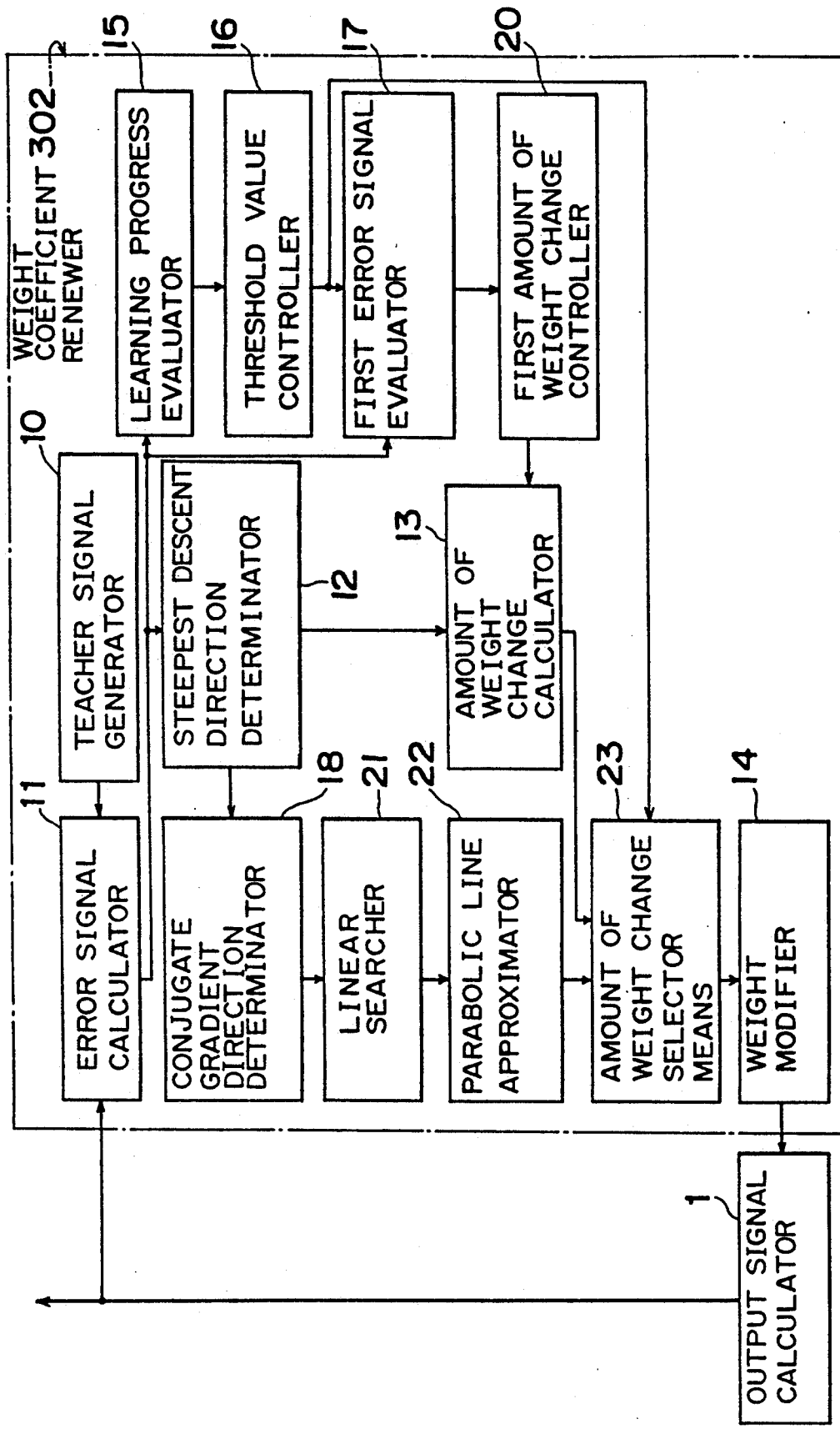
FIG. 3 is a block diagram of a learning machine according to a third embodiment of the present invention.

FIG. 3 is a block diagram of a third embodiment of a learning machine according to the present invention.

As shown in FIG. 3, this learning machine comprises an output signal calculator 1 and a weight coefficient renewer 302. The weight coefficient renewer 302 includes a teacher signal generator 10, an error signal calculator 11, a steepest descent direction determinator 12, an amount of weight change calculator 13, and a weight modifier 14. Each of the output signal calculator 1, the teacher signal generator 10, the error signal calculator 11, the steepest descent direction determinator 12, the amount of weight change calculator 13, and the weight modifier 14 is the same as the corresponding components of the conventional learning machine described hereinabove. In addition, the weight coefficient renewer 302 includes a learning progress evaluator 15, a threshold value controller 16, a first error signal evaluator 17, a conjugate gradient direction determinator 18, a first amount of weight change controller 20, a linear searcher 21, a parabolic line approximator 22, and an amount of weight change selector 23.

The operation of the learning machine as described hereinabove is described hereinbelow.

As in the conventional learning machine described above, an output signal calculator 1 calculates an output signal, and the error signal calculator 11 calculates an error E by applying the equation (1) to this output signal and the output from the teacher signal generator 10. Based on this calculated error E, the steepest descent direction determinator 12 computes $$g = \partial E / \partial W \quad (2)$$

to obtain the direction of steepest descent, which is the direction of change of the weight vector of the output signal calculator 1.

The amount of weight change calculator 13 calculates the amount of change in the weight vector of the output signal calculator 1 from the direction of steepest descent using the following equation $$\Delta W = -\epsilon \cdot g + \alpha \cdot \Delta \overline{W}' \quad (3)$$

where $\epsilon$ is a positive constant called the learning rate, $\alpha$ is a positive constant called the acceleration parameter, and $\Delta \overline{W}'$ is the amount of change in the weight vector in the previous learning cycle.

At this time the first amount of weight change controller 20 sets to "0" the amount of change in the weight coefficient of the multiple-input single-output signal processors 3 in the highest level of the output signal calculator 1 for which the error $|t_{pk} - o_{pk}|$ is evaluated by the first error signal evaluation moans 17 to be smaller than a threshold value T1 set by the threshold value controller 16. It is to be noted that the threshold value controller 16 switches the threshold value T1 to a smaller value as learning progresses based on the evaluated result of learning progress output by the learning progress evaluator 15. The learning progress evaluator 15 evaluates the progress of the learning operation using a variety of means, including evaluating the sum of errors of the multiple-input single-output signal processors 3 in the highest level of the output signal calculator 1, by referencing the number of learning cycles, by counting the number of multiple-input single-output signal processors 3 outputting an error greater than a threshold value in the highest level of the output signal calculator 1, and by applying the maximum value in one learning cycle of the error signal calculator 11.

The conjugate gradient direction determinator 18 calculates a conjugate gradient direction from the direction of steepest descent using the following equation $$d = g + \beta \cdot d' \quad (4)$$

where $\beta$ is a constant defined as $$\beta = |g|^2 / |g'|^2 \quad (5)$$

$\vec{d}'$ is a conjugate gradient direction in the previous learning cycle, and $|\vec{g}'|$ is the norm of a direction $\vec{g}'$ of steepest descent in the previous learning cycle. It is to be noted that the direction of weight change in the first learning cycle is determined to be the direction of steepest descent.

The linear searcher 21 calculates the amount of weight change to plural learning rates for the direction of the conjugate gradient, and the parabolic line approximator 22 approximates the parabolic line of the error curve from the value of the error to the learning rate with a low error value, and after selecting the amount of weight change at which the error is lowest, outputs this to the amount of weight change selector 23.

The amount of weight change selector 23 selects either the amount of weight change calculated from the direction of steepest descent or the amount of weight change determined by the parabolic line approximation means 22 from among the weight change amounts calculated from the plural learning rates for the direction of the conjugate gradient according to the threshold value T1, and outputs the result to the weight modifier 14. For example, the amount of weight change selector 23 may select the amount of weight change calculated from the direction of steepest descent during the early learning process, and select the amount of weight change determined by the parabolic line approximation means 22 from among the weight change amounts calculated from the plural learning rates for the direction of the conjugate gradient during the later learning process.

The weight modifier 14 thus changes the weight vector of the output signal calculator 1 based on the calculated amount of change for the weight vector.

The amount of error is thus reduced by repeatedly renewing the weight, and when the error is sufficiently small, it is concluded that the output signal is sufficiently close to the desired value and learning stops.

Thus, learning efficiency is improved and the time required for learning is shortened because not only is the weight not changed for multiple-input single-output signal processors of which the error is less than a threshold value T1, but also the threshold value T1 which is the evaluation standard for whether the weight is changed is reduced as learning progresses, thereby enabling learning to progress in approximate degrees during the early learning process and gradually increasing precision as learning progresses. Moreover, because the amount of weight change calculated from the direction of steepest descent is selected during the early learning process, and the amount of weight change determined by the parabolic line approximator from among the weight change amounts calculated from the plural learning rates for the direction of the conjugate gradient is selected during the later learning process, and the weight is changed, learning efficiency improves and the time required for learning is shortened.

Figure 4:
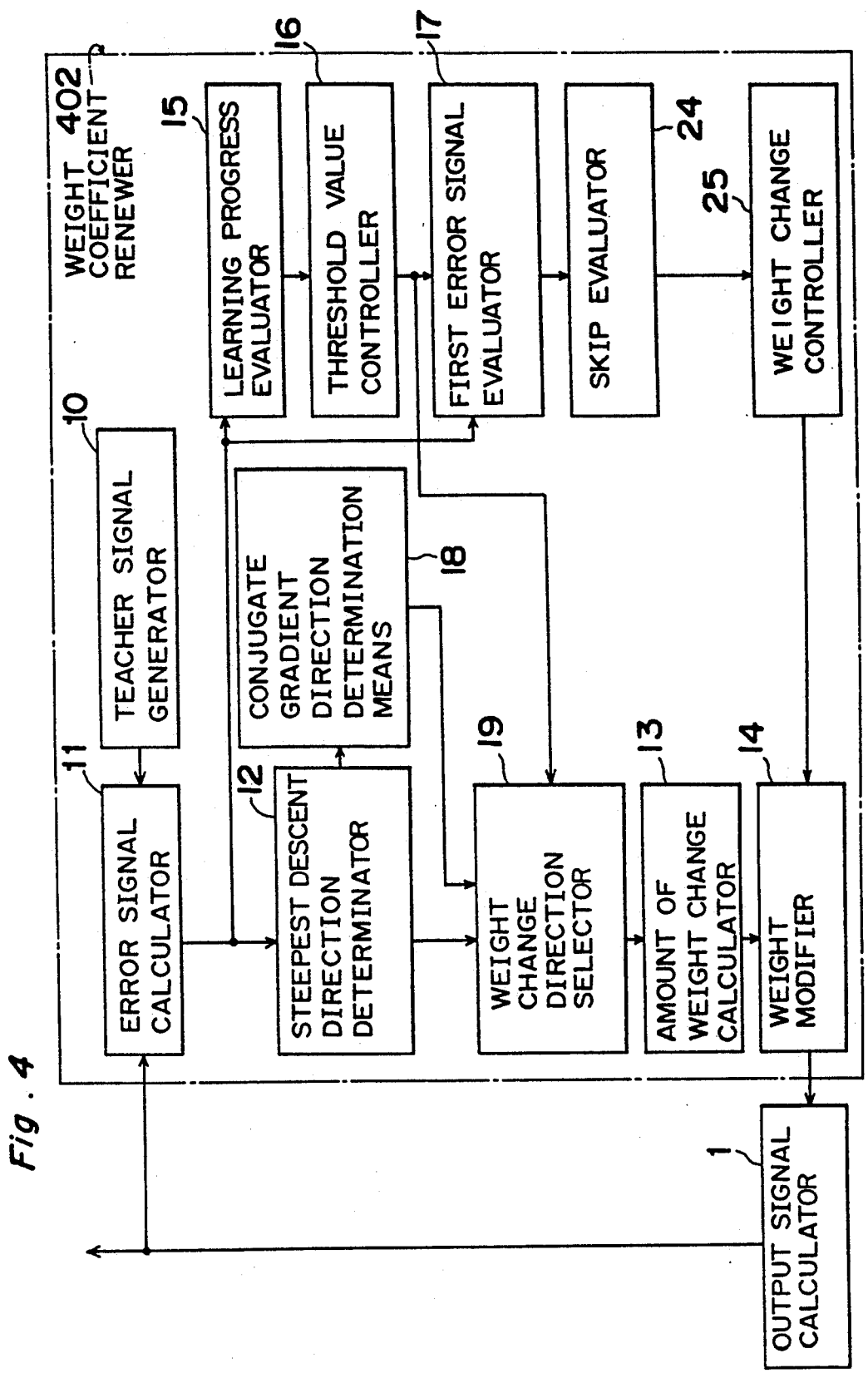
FIG. 4 is a block diagram of a learning machine according to a fourth embodiment of the present invention.

FIG. 4 is a block diagram of a fourth embodiment of a learning machine according to the present invention.

As shown in FIG. 4, this learning machine comprises an output signal calculator 1 and a weight coefficient renewer 402. The weight coefficient renewer 402 includes a teacher signal generator 10, an error signal calculator 11, a steepest descent direction determinator 12, an amount of weight change calculator 13, and a weight modifier 14. Each of the output signal calculator 1, the teacher signal generator 10, the error signal calculator 11, the steepest descent direction determinator 12, the amount of weight change calculator 13, and the weight modifier 14 is the same as the corresponding components of the conventional learning machine described hereinabove. In addition, the weight coefficient renewer 402 includes a learning progress evaluator 15, a threshold value controller 16, a first error signal evaluator 17, a conjugate gradient direction determinator 18, a weight change direction selection 19, a skip evaluator 24, and a weight change controller 25.

The operation of the learning machine according to the fourth embodiment of the present invention as described hereinabove is described hereinbelow.

As in the conventional learning machine described above, the output signal calculator 1 calculates the output signal, and the error signal calculator 11 calculates an error E by applying the equation (1) to this output signal and the output from the teacher signal generator 10. Based on this calculated error E, the steepest descent direction determination means 12 computes $$g = \partial E / \partial W \quad (2)$$

to obtain the direction of steepest descent, which is the direction of change of the weight vector of the output signal calculator 1.

The conjugate gradient direction determinator 18 calculates the conjugate gradient direction from the direction of steepest descent using the following equation $$d = g + \beta \cdot d' \quad (4)$$

where $\beta$ is a constant defined as $$\beta = |g|^2 / |g'|^2 \quad (5)$$

$\vec{d}'$ is a conjugate gradient direction in the previous learning cycle, and $|\vec{g}'|$ is the norm of the direction $\vec{g}'$ of steepest descent in the previous learning cycle. It is to be noted that the direction of weight change in the first learning cycle is determined to be the direction of steepest descent.

The threshold value controller 16 switches a threshold value T2 to a smaller value as learning progresses based on the evaluated result of learning progress output by the learning progress evaluator 15. The learning progress evaluator 15 evaluates the progress of the learning operation using a variety of means, including evaluating the sum of errors of the multiple-input single-output signal processors 3 in the highest level of the output signal calculator 1, by referencing the number of learning cycles, by counting the number of multiple-input single-output signal processors 3 outputting an error greater than a threshold value in the highest level of the output signal calculator 1, and by applying the maximum value in one learning cycle of the error signal calculator 11.

The weight change direction selector 19 selects either the direction of steepest descent or the direction of the conjugate gradient according to the threshold value T2 from the threshold value controller 16, and outputs the result to the amount of weight change calculator 13. For example, the weight change direction selector 19 may select the direction of steepest descent for learning during early learning process and the direction of the conjugate gradient for the later learning process. If the selected direction of weight change is the direction of steepest descent, the amount of weight change calculator 13 calculates the amount of change in the weight vector of the output signal calculator 1 from the following equation $$\Delta W = -\epsilon \cdot g + \alpha \cdot \Delta W' \quad (3)$$

where $\epsilon$ is a positive constant called the learning rate, $\alpha$ is a positive constant called the acceleration parameter, and $\Delta \vec{W}'$ is the amount of change in the weight vector in the previous learning cycle. On the other hand, if the selected direction of weight change is the direction of the conjugate gradient, the amount of change in the weight vector is calculated from the following equation $$\Delta W = -\epsilon \cdot d \quad (6).$$

The weight modifier 14 changes the weight vector of the output signal calculator 1 based on this calculated change in the weight vector.

At this time the first error signal evaluator 17 determines whether the error $|t_{pk} - o_{pk}|$ is less than the threshold value T2 set by the threshold value controller 16, and outputs a "0" or "1" to the skip evaluator 24 if the error is greater or less than, respectively, the threshold value T2. The skip evaluator 24 counts the evaluation result to the current input signal, and outputs a skip signal if the error $|t_{pk} - o_{pk}|$ of all multiple-input single-output signal processors 3 in the highest level is less than the threshold value T2. When the skip evaluator 24 outputs the skip signal, the weight change controller 25 controls the weight modifier 14 so that the weight change operation is not applied to the current input signals.

The amount of error is thus reduced by repeatedly renewing the weight, and when the error is sufficiently small, it is concluded that the output signal is sufficiently close to the desired value and learning stops.

Thus, the data computation volume is greatly reduced and learning efficiency is therefore improved and the time required for learning is shortened because not only is the weight change operation of the weight modifier skipped when the error of all multiple-input single-output signal processors to the input data is less than a threshold value T2, but the threshold value T2 which is the evaluation standard for whether the weight is changed is also reduced as learning progresses, thereby enabling learning to progress in approximate degrees during the early learning process and gradually increasing precision as learning progresses. Moreover, because the direction of weight change is set to the direction of steepest descent, which is locally the most efficient, during the early learning process and is set to the direction of the conjugate gradient, which is generally the most efficient, during the later learning process to change the weight, learning efficiency improves and the time required for learning is shortened.

Figure 5:
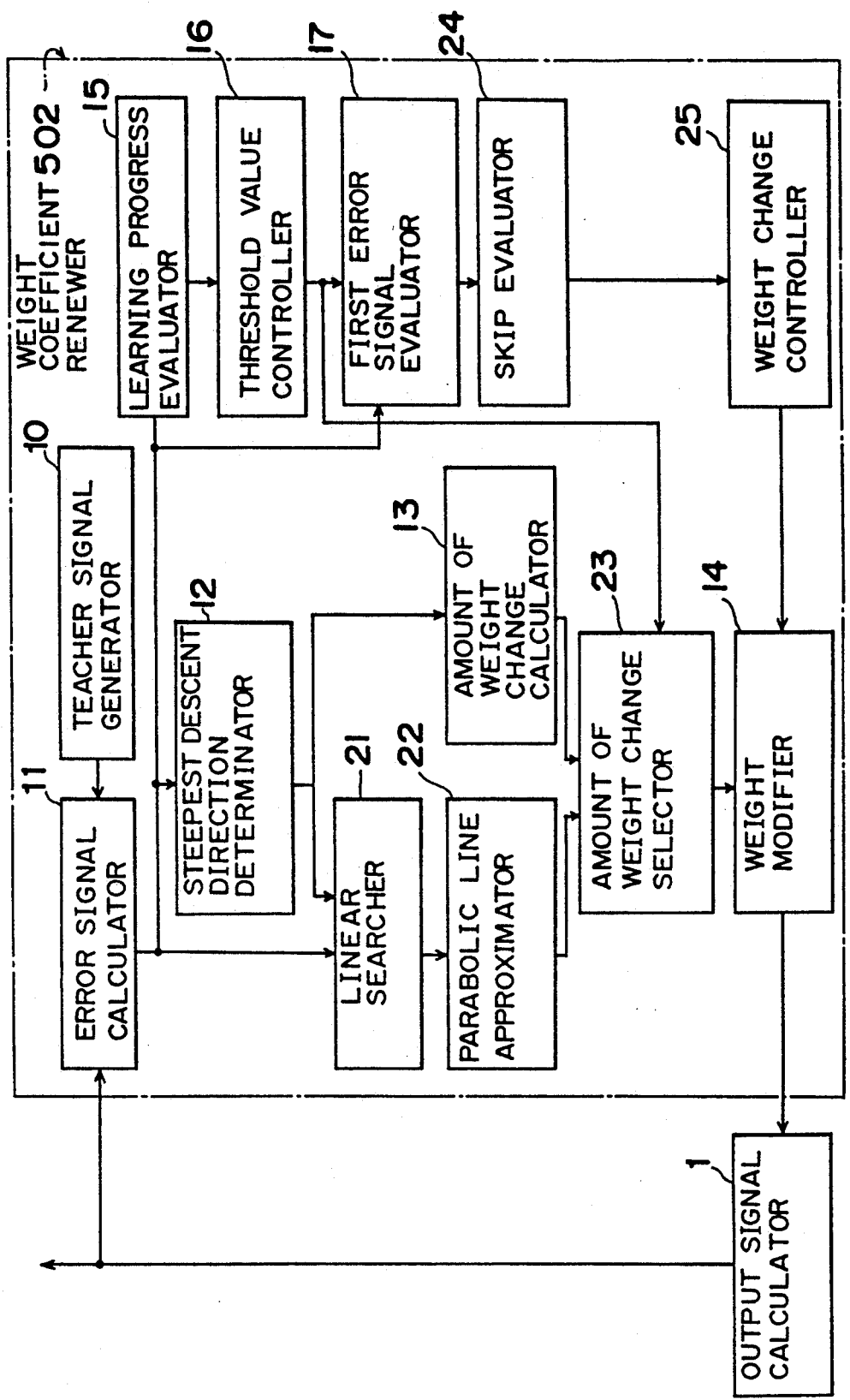
FIG. 5 is a block diagram of a learning machine according to a fifth embodiment of the present invention.

FIG. 5 is a block diagram of a fifth embodiment of a learning machine according to the present invention.

As shown in FIG. 5, this learning machine comprises a output signal calculator 1 and a weight coefficient renewer 502. The weight coefficient renewer 502 includes a teacher signal generator 10, an error signal calculator 11, a steepest descent direction determinator 12, an amount of weight change calculator 13, and a weight modifier 14. Each of the output signal calculator 1, the teacher signal generator 10, the error signal calculator 11, the steepest descent direction determinator 12, the amount of weight change calculator 13, and the weight modifier 14 is the same as the corresponding components of the conventional learning machine described hereinabove. In addition, the weight coefficient renewer includes a learning progress evaluator 15, a threshold value controller 16, a first error signal evaluator 17, a linear searcher 21, a parabolic line approximator 22, an amount of weight change selector 23, a skip evaluator 24, and a weight change controller 25.

The operation of the learning machine as described hereinabove is described hereinbelow.

As in the conventional learning machine described above, the output signal calculator 1 calculates the output signal, and the error signal calculator 11 calculates an error by applying the equation (1) to this output signal and the output from the teacher signal generator 10. Based on this calculated error E, the steepest descent direction determination means 12 computes $$g = \partial E / \partial W \quad (2)$$

to obtain the direction of steepest descent, which is the direction of change of the weight vector of the output signal calculator 1.

The amount of weight change calculator 13 calculates and outputs to the amount of weight change selector 23 the amount of change in the weight vector of the output signal calculator 1 from the direction of steepest descent using the following equation $$\Delta W = -\epsilon^* g + \alpha^* \Delta W' \quad (3)$$

where $\epsilon$ is a positive constant called the learning rate, $\alpha$ is a positive constant called the acceleration parameter, and $\Delta \overline{W}'$ is the amount of change in the weight vector in the previous learning cycle.

The linear searcher 21 calculates the amount of weight change to plural learning rates for the direction of steepest descent, and the parabolic line approximator 22 approximates the parabolic line of the error curve from the value of the error to tho learning rate with a low error value, and after selecting the amount of weight change at which the error is lowest, outputs this to the amount of weight change selector 23.

The threshold value controller 16 switches a threshold value T2 to a smaller value as learning progresses based on the evaluated result of learning progress output by the learning progress evaluator 15. The learning progress evaluator 15 evaluates the progress of the learning operation using a variety of means, including evaluating the sum of errors of the multiple-input single-output signal processors 3 in the highest level of the output signal calculator 1, by referencing the number of learning cycles, by counting the number of multiple-input single-output signal processors 3 outputting an error greater than a threshold value in the highest level of the output signal calculator 1, and by applying the maximum value in one learning cycle of the error signal calculator 11.

The amount of weight change selector 23 selects either the amount of weight change calculated from the direction of steepest descent or the amount of weight change determined by the parabolic line approximator 22 from among the weight change amounts calculated from the plural learning rates for the direction of steepest descent according to the threshold value T2, and outputs the result to the weight modifier 14. For example, the amount of weight change selector. 23 may select the amount of weight change calculated from the direction of steepest descent during the early learning process, and select the amount of weight change determined by the parabolic line approximator 22 from among the weight change amounts calculated from the plural learning rates for the direction of steepest descent during the later learning process.

The weight modifier 14 thus changes the weight vector of the output signal calculator 1 based on the calculated amount of change for the weight vector.

At this time the first error signal evaluator 17 determines whether the error $|t_{pk} - o_{pk}|$ is less than the threshold value T2 set by the threshold value controller 16, and outputs a "0" or "1" to the skip evaluator 24 if the error is greater or less than, respectively, the threshold value T2. The skip evaluator 24 counts the evaluation result to the current input signal, and outputs a skip signal if the error $|t_{pk} - o_{pk}|$ of all multiple-input single-output signal processors 3 in the highest level is less than the threshold value T2. When the skip evaluator 24 outputs the skip signal, the weight change controller 25 controls the weight modifier 14 so that the weight change operation is not applied to the current input signals.

The amount of error is thus reduced by repeatedly renewing the weight, and when the error is sufficiently small, it is concluded that the output signal is sufficiently close to the desired value and learning stops.

Thus, the data computation volume is greatly reduced and learning efficiency is therefore improved and the time required for learning is shortened because not only is the weight change operation of the weight modification means skipped when the sum of errors of all multiple-input single-output signal processors to the input data is less than a threshold value T2, but also the threshold value T2 which is the evaluation standard for whether the weight is changed is reduced as learning progresses, thereby enabling learning to progress in approximate degrees during the early learning process and gradually increasing precision as learning progresses. Moreover, because the amount of weight change calculated from the direction of steepest descent is selected during the early learning process, and the amount of weight change determined by the parabolic line approximator from among the weight change amounts calculated from the plural learning rates for the direction of steepest descent is selected during the later learning process, and the weight is changed, learning efficiency improves and the time required for learning is shortened.

Figure 6:
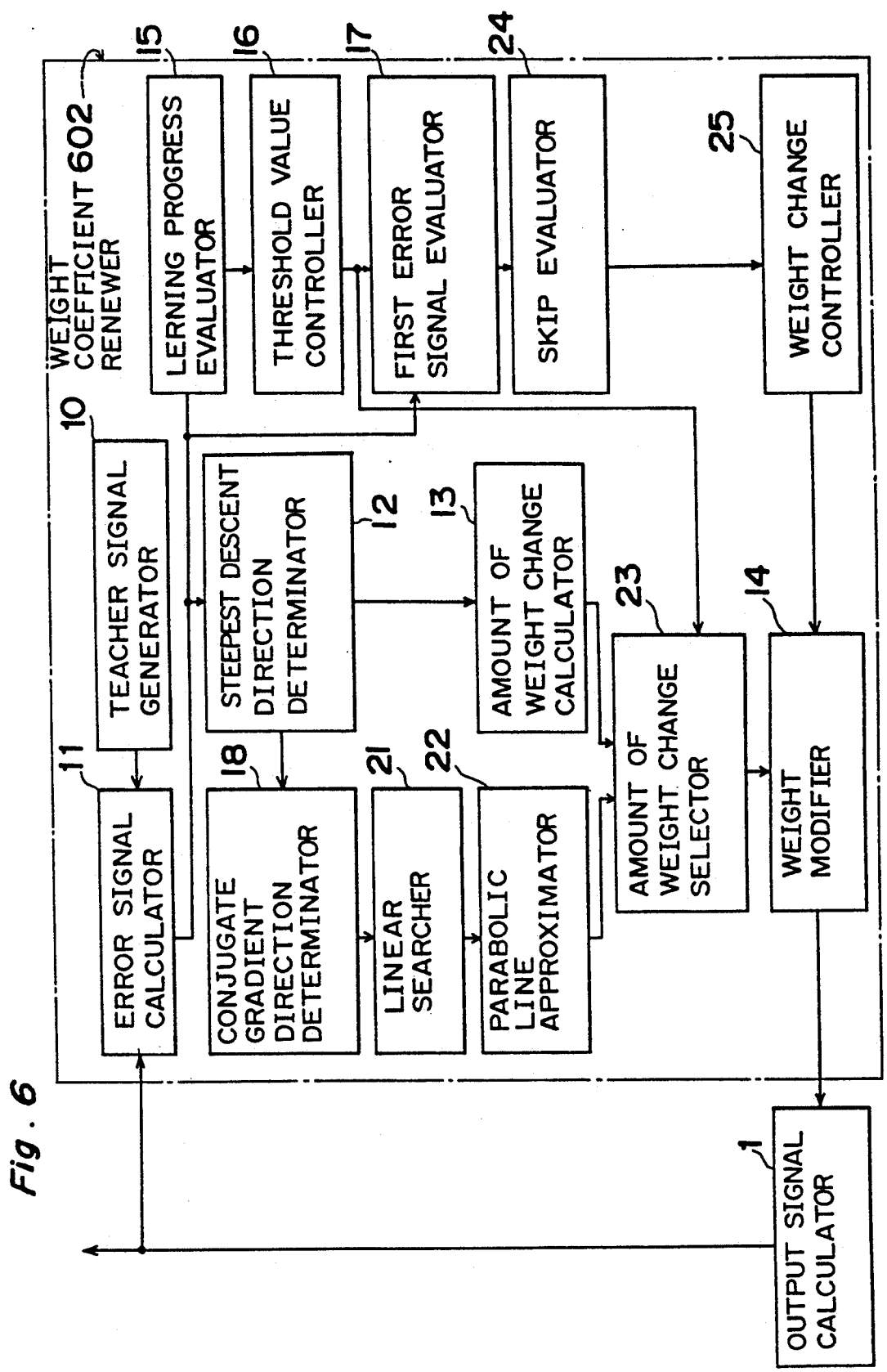
FIG. 6 is a block diagram of a learning machine according to a sixth embodiment of the present invention.

FIG. 6 is a block diagram of a sixth embodiment of a learning machine according to the present invention.

As shown in FIG. 6, this learning machine comprises a output signal calculator 1 and a weight coefficient renewer 602. Te weight coefficient renewer 602 includes a teacher signal generator 10, an error signal calculator 11, a steepest descent direction determinator 12, an amount of weight change calculator 13, and a weight modifier 14. Each of the output signal calculator 1, the teacher signal generator 10, the error signal calculator 11, the steepest descent direction determinator 12, the amount of weight change calculator 13, and the weight modifier 14 is the same as the corresponding components of the conventional learning machine described hereinabove. In addition, the weight coefficient renewer 602 includes a learning progress evaluator 15, a threshold value controller 16, a first error signal evaluator 17, a conjugate gradient direction determinator 18, a linear searcher 21, a parabolic line approximator 22, an amount of weight change selector 23, a skip evaluator 24, and a weight change controller 25.

The operation of the learning machine as described hereinabove is described hereinbelow.

As in the conventional learning machine described above, the output signal calculator 1 calculates the output signal, and the error signal calculator 11 calculates an error E by applying the equation (1) to this output signal and the output from the teacher signal generator 10. Based on this calculated error E, the steepest descent direction determinator 12 computes $$g = \partial E / \partial W \quad (2)$$

to obtain the direction of steepest descent, which is the direction of change of the weight vector of the output signal calculator 1.

The amount of weight change calculator 13 calculates the amount of change in the weight vector of the output signal calculator 1 from the direction of steepest descent using the following equation $$\Delta W = -\epsilon \cdot g + \alpha \cdot \Delta W' \quad (3)$$

where $\epsilon$ is a positive constant called the learning rate, $\alpha$ is a positive constant called the acceleration parameter, and $\Delta \overline{W}'$ is the amount of change in the weight vector in the previous learning cycle.

The conjugate gradient direction determinator 18 calculates the conjugate gradient direction from the direction of steepest descent using the following equation $$d = g + \beta \cdot d' \quad (4)$$

where $\beta$ is a constant defined as $$\beta = |g|^2 / |g'|^2 \quad (5)$$

$\vec{d}'$ is the conjugate gradient direction in the previous learning cycle, and $|\vec{g}'|$ is the norm of the direction $\vec{g}'$ of steepest descent in the previous learning cycle. It is to be noted that the direction of weight change in the first learning cycle is determined to be the direction of steepest descent.

the linear searcher 21 calculates the amount of weight change to plural learning rates for the direction of the conjugate gradient, and the parabolic line approximator 22 approximates the parabolic line of the error curve from the value of the error to the learning rate with a low error value, and after selecting the amount of weight change at which the error is lowest, outputs this to the amount of weight change selector 23.

The threshold value controller 16 switches the threshold value T2 to a smaller value as learning progresses based on the evaluated result of learning progress output by the learning progress evaluator 15. The learning progress evaluator 15 evaluates the progress of the learning operation using a variety of means, including evaluating the sum of errors of the multiple-input single-output signal processors 3 in the highest level of the output signal calculator 1, by referencing the number of learning cycles, by counting the number of multiple-input single-output signal processors 3 outputting an error greater than a threshold value in the highest level of the output signal calculator 1, and by applying the maximum value in one learning cycle of the error signal calculator 11.

The amount of weight change selector 23 selects either the amount of weight change calculated from the direction of steepest descent or the amount of weight change determined by the parabolic line approximator 22 from among the weight change amounts calculated from the plural learning rates for the direction of the conjugate gradient according to the threshold value T2, and outputs the result to the weight modifier 14. For example, the amount of weight change selector 23 may select the amount of weight change calculated from the direction of steepest descent during the early learning process, and select the amount of weight change determined by the parabolic line approximator 22 from among the weight change amounts calculated from the plural learning rates for the direction of the conjugate gradient during the later learning process.

The weight modifier 14 thus changes the weight vector of the output signal calculator 1 based on the calculated amount of change for the weight vector.

At this time the first error signal evaluator 17 determines whether the error $|t_{pk} - o_{pk}|$ is less than the threshold value T2 set by the threshold value controller 16, and outputs a "0" or "1" to the skip evaluator 24 if the error is greater or less than, respectively, the threshold value T2. The skip evaluator 24 counts the evaluation result to the current input signal, and outputs a skip signal if the error $|t_{pk} - o_{pk}|$ of all multiple-input single-output signal processors 3 in the highest level is less than the threshold value T2. When the skip evaluator 24 outputs the skip signal, the weight change controller 25 controls the weight modifier 14 so that the weight change operation is not applied to the current input signals.

The amount of error is thus reduced by repeatedly renewing the weight, and when the error is sufficiently small, it is concluded that the output signal is sufficiently close to the desired value and learning stops.

Thus, the data computation volume is greatly reduced and learning efficiency is therefore improved and the time required for learning is shortened because not only is the weight change operation of the weight modification means skipped when the sum of errors of all multiple-input single-output signal processors to the input data is less than a threshold value T2, but also the threshold value T2 which is the evaluation standard for whether the weight is changed is reduced as learning progresses, thereby enabling learning to progress in approximate degrees during the early learning process and gradually increasing precision as learning progresses. Moreover, because the amount of weight change calculated from the direction of steepest descent is selected during the early learning process, and the amount of weight change determined by the parabolic line approximator from among the weight change amounts calculated from the plural learning rates for the direction of the conjugate gradient is selected during the later learning process, and the weight is changed, learning efficiency improves and the time required for learning is shortened.

Figure 7:
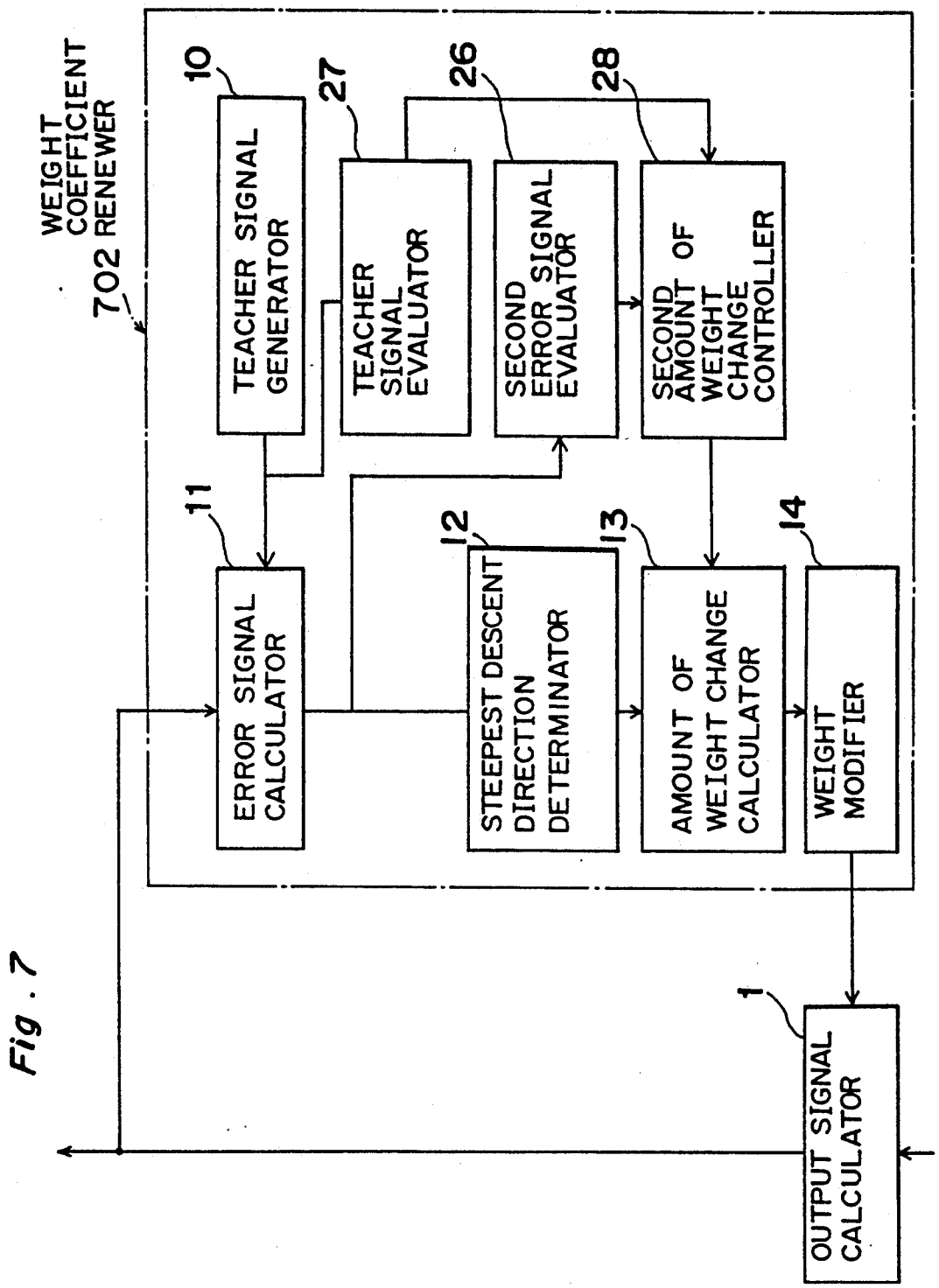
FIG. 7 is a block diagram of a learning machine according to a seventh embodiment of the present invention.
Figure 8:
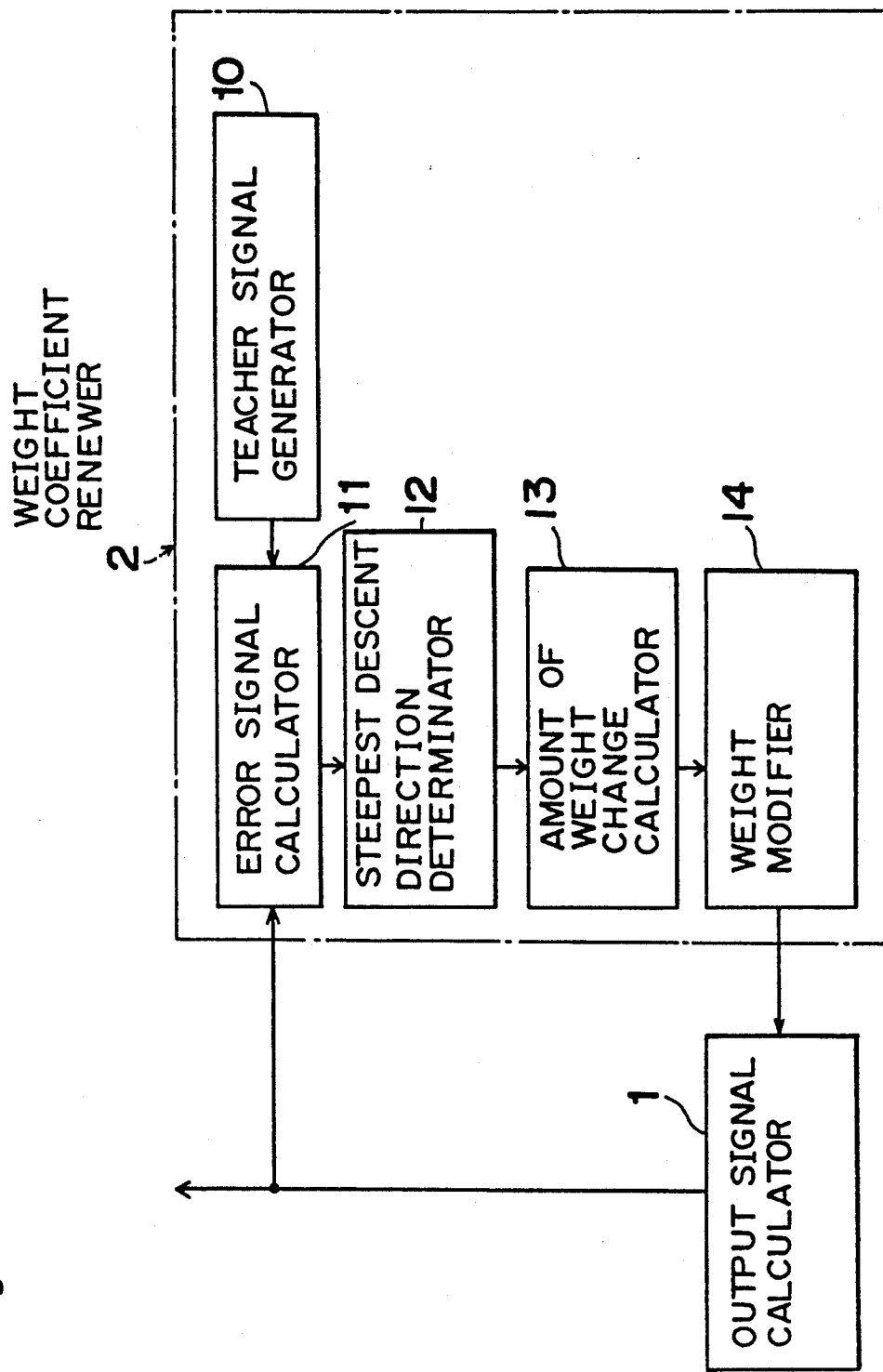
FIG. 8 is a block diagram of a conventional learning machine.
Figure 9:
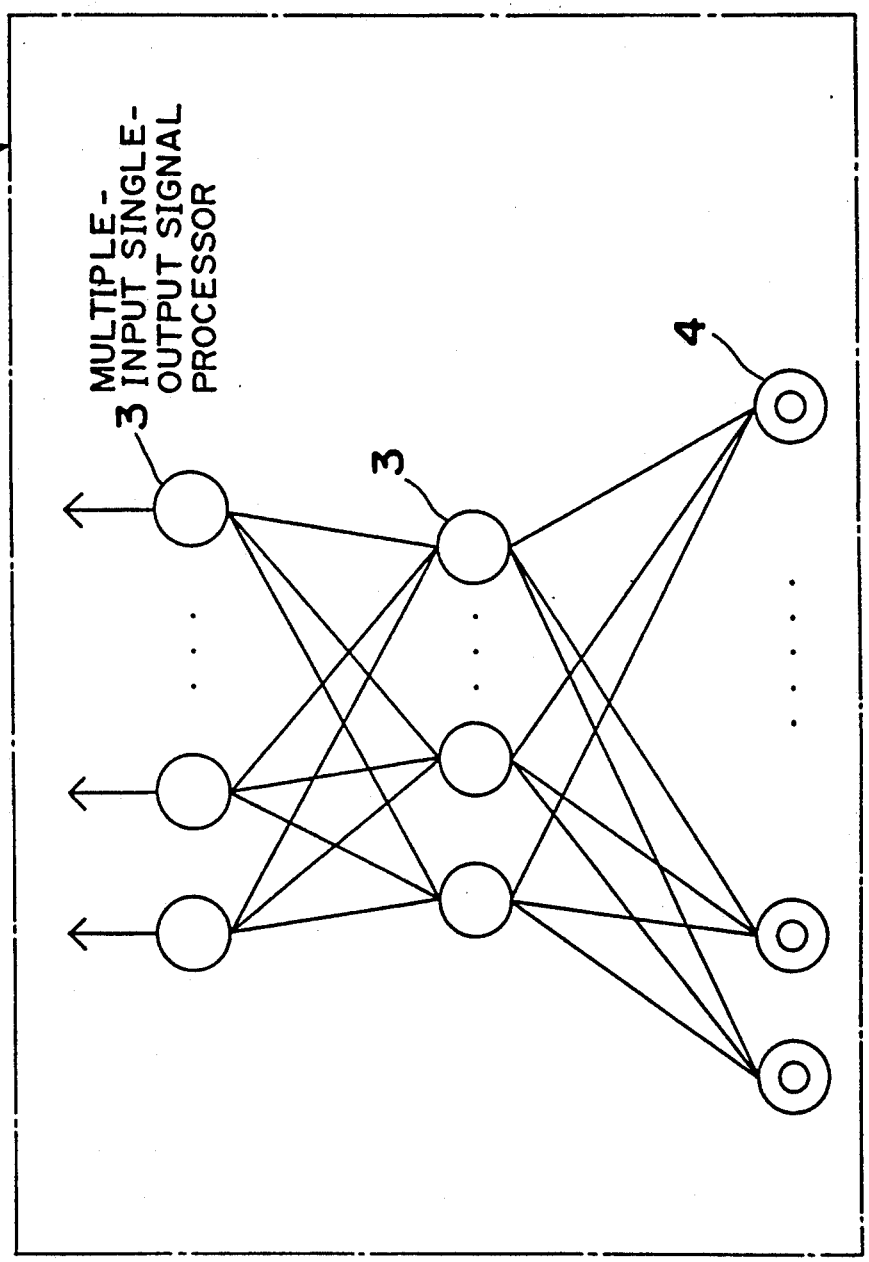
FIG. 9 is a block diagram of an output signal calculator means in a conventional learning machine.
Figure 10:
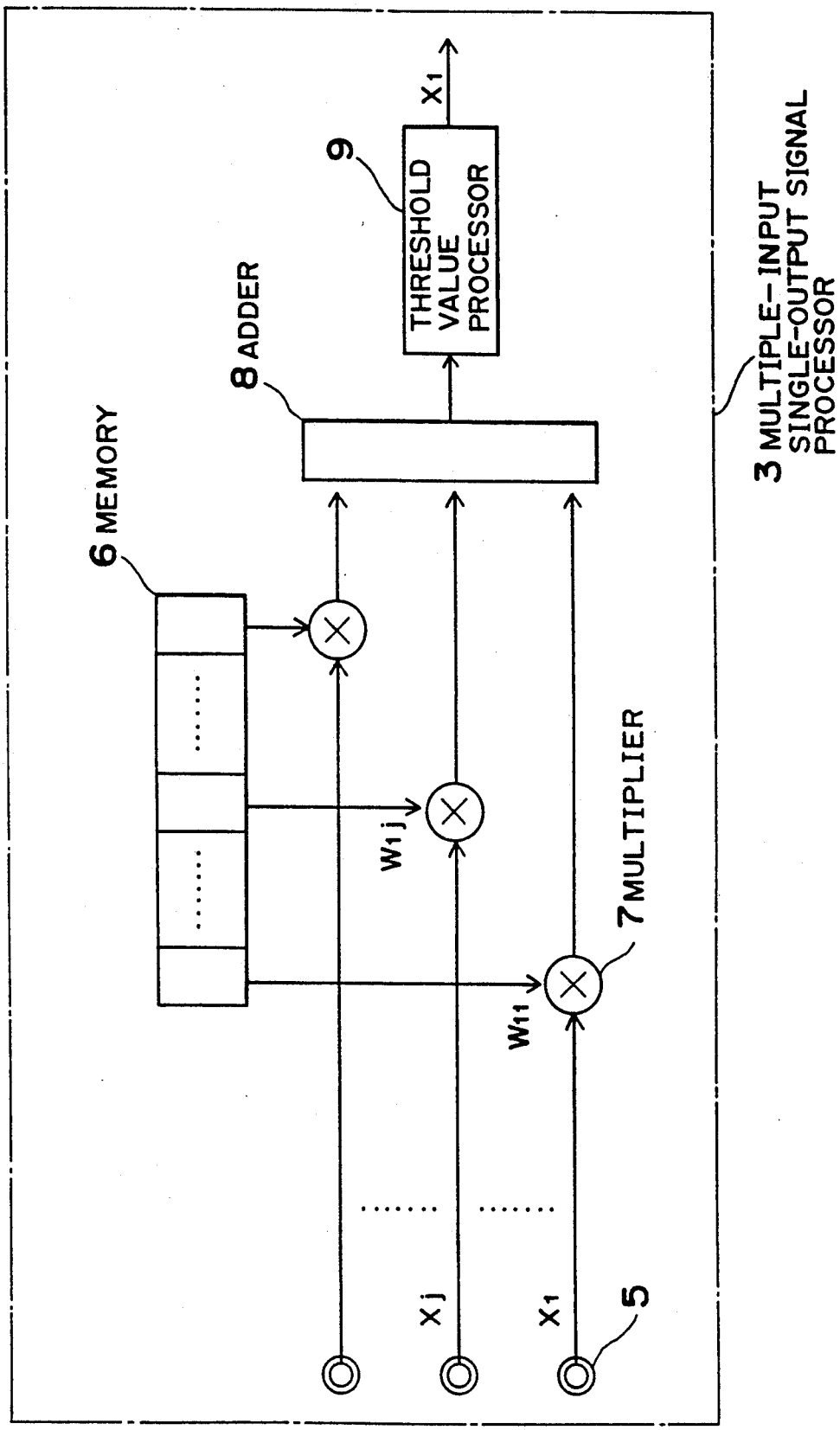
FIG. 10 is a block diagram of a multiple-input single-output signal processor in the conventional learning machine.
Figure 11:
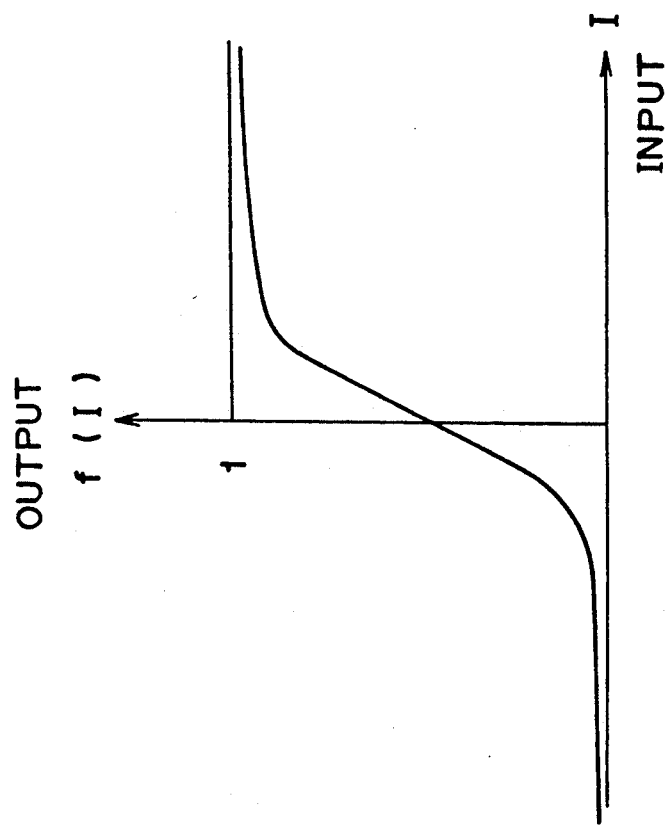
FIG. 11 is a graph of the input/output characteristics of a threshold value processor in the conventional learning machine.

FIG. 7 is a block diagram of a seventh embodiment of a learning machine according to the present invention.

As shown in FIG. 7, this learning machine comprises a output signal calculator 1 and a weight coefficient renewer 702. The weight coefficient renewer 702 includes a teacher signal generator 10, an error signal calculator 11, a steepest descent direction determinator 12, an amount of weight change calculator 13, and a weight modifier 14. Each of the output signal calculator 1, the teacher signal generator 10, the error signal calculator 11, the steepest descent direction determinator 12, the amount of weight change calculator 13, and the weight modifier 14 is the same as the corresponding components of the conventional learning machine described hereinabove. In addition, the weight coefficient renewer 702 includes a second error signal evaluator 26, a teacher signal evaluator 27, and a second amount of weight change controller 28.

The operation of the learning machine as described hereinabove is described hereinbelow.

As in the conventional learning machine described above, the output signal calculator 1 calculates the output signal, and the error signal calculator 11 calculates an error E by applying the equation (1) to this output signal and the output from the teacher signal generator 10. Based on this calculated error E, the steepest descent direction determinator 12 computes $$g = \partial E / \partial W \quad (2)$$

to obtain the direction of steepest descent, which is the direction of change of the weight vector of the output signal calculator 1.

The amount of weight change calculator 13 calculates the amount of change in the weight vector of the output signal calculator 1 from the direction of steepest descent using the following equation $$\Delta W = -\epsilon^* g + \alpha^* \Delta \overline{W}' \quad (3)$$

where $\epsilon$ is a positive constant called the learning rate, $\alpha$ is a positive constant called the acceleration parameter, and $\Delta \overline{W}'$ is the amount of change in the weight vector in the previous learning cycle.

At this time, the second amount of weight change controller 28 multiplies by m1 (m1>1) times the amount of change for the weight coefficient of the multiple-input single-output signal processors 3 in the highest level of the output signal calculator 1 for which the error $|t_{pk} - o_{pk}|$ has been determined to be greater than a threshold value T3 by the second error signal evaluation means 26 and for which the teacher signal has been determined to be "1" by the teacher signal evaluator 27.

The weight modifier 14 thus changes the weight vector of the output signal calculator 1 based on the calculated amount of change for the weight vector.

The amount of error is thus reduced by repeatedly renewing the weight, and when the error is sufficiently small, it is concluded that the output signal is sufficiently close to the desired value and learning stops.

Thus, the multiple-input single-output signal processors 3 with a large error value can be more quickly converged and the time required for learning can be shortened because, of the multiple-input single-output signal processors 3 with a large error value, and the weight coefficient of these which should output a particularly slow convergence value "1" (multiple-input single-output signal processors 3 with a teacher signal value of "1") is actively changed.

It is to be noted that the second amount of weight change controller 28 in this embodiment may increase the amount of weight change m2 (m2>1) times for multiple-input single-output signal processors 3 in the highest level of the output signal calculator 1 for which the error $|t_{pk} - o_{pk}|$ has been determined to be greater than the threshold value T3 by the second error signal evaluator 26, and may further increase the amount of weight change m3 (m3>1) times for those multiple-input single-output signal processors 3 for which the teacher signal has been determined to be "1" by the teacher signal evaluator 27. In this case, the multiple-input single-output signal processors 3 with a large error value can be more quickly converged and the time required for learning can be reduced because not only is the weight coefficient of the multiple-input single-output signal processors 3 outputting a high error value actively changed, but also the weight coefficient is changed even more actively for those multiple-input single-output signal processors 3 which should output a slow convergence "1" (teacher signal=1).

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A learning machine having an output signal calculation means comprising plural multiple-input single-output signal processors network connected in a hierarchical structure without mutual connections within levels in such a manner that signals propagate only to a higher level, and a weight coefficient renewer which renews values of weight coefficients of the output signal calculation means based on output signals obtained by the output signal calculation means;

each multiple-input single-output signal processor comprising a memory to store plural weight coefficients, an input section for inputting plural data, multiplying means to weight the input data from the input section by the weight coefficients stored in the memory, an adding means to add the plural data weighted by the multiplying means, and a threshold value processor to limit an output of the adding means to a value within a predetermined range; and the weight coefficient renewing means comprising a teacher signal generator to produce as a teacher signal a desirable value for the output signal of the output signal calculation means, an error signal calculation means to obtain an error between the output signal and the teacher signal, a steepest descent direction determination means to obtain a direction of steepest descent from an output of the error signal calculation means;

the weight coefficient renewing means further comprising a conjugate gradient direction determination means to obtain a direction of a conjugate gradient from the direction of steepest descent, a learning progress evaluation means to evaluate progress of learning from the error output from the error signal calculation means, a threshold value control means which gradually reduces a threshold value as learning progresses according to an evaluation result of the learning progress evaluation means, a first error signal evaluation means which evaluates whether the output of the error signal calculation means is less than the threshold value of the threshold value control means, a weight change direction selection means which selects either the direction of the conjugate gradient or the direction of the steepest descent as a direction of weight change according to the level of the threshold value, an amount of weight change calculation means which calculates an amount of change in the weight coefficient from the selected direction of weight change, a first amount of weight change control means which sets the amount of weight coefficient change to 0 when the error is determined to be less than the threshold value by the first error signal evaluation means, and a weight modification means which changes the value of the weight coefficient stored in the memory according to an output of the amount of weight change calculation means.

2. A learning machine having an output signal calculation means comprising plural multiple-input single-output signal processors network connected in a hierarchical structure without mutual connections within levels in such a manner that signals propagate only to a higher level, and a weight coefficient renewing means which renews values of weight coefficients of the output signal calculation means based on output signals obtained by the output signal calculation means;

each multiple-input single-output signal processor comprising a memory to store plural weight coefficients, an input section for inputting plural data, multiplying means to weight the input data from the input section by the weight coefficients stored in the memory, an adding means to add the plural data weighted by the multiplying means, and a threshold value processor to limit an output of the adding means to a value within a predetermined range; and the weight coefficient renewing means comprising a teacher signal generator to produce as a teacher signal a desirable value for the output signal of the output signal calculation means, an error signal calculation means to obtain an error between the output signal and the teacher signal, a steepest descent direction determination means to obtain a direction of steepest descent from an output of the error signal calculation means;

the weight coefficient renewing means further comprising an amount of weight change calculation means which calculates an amount of change in the weight coefficient from the direction of steepest descent, a linear search means which outputs amounts of weight change to plural learning rates for the direction of steepest descent, a parabolic line approximation means which determines an amount of weight change by parabolic line approximation method from the plural weight change amounts output from the linear search means, a learning progress evaluation means evaluates progress of learning from the error output by the error signal calculation means, a threshold value control means which gradually reduces a threshold value as learning progresses according to an evaluation result of the learning progress evaluation means, a first error signal evaluation means which evaluates whether the output of the error signal calculation means is less than the threshold value of the threshold value control means, a first amount of weight change control means which sets the amount of weight coefficient change to 0 when the error is determined to be less than the threshold value by the first error signal evaluation means, an amount of weight change selection means which selects either an output of the amount of weight change calculation means or an output of the parabolic line approximation means according to the level of the threshold value, and a weight modification means which changes the value of the weight coefficient stored in the memory according to an amount of weight change selected by the amount of weight change selection means.

3. A learning machine having an output signal calculation means comprising plural multiple-input single-output signal processors network connected in a hierarchical structure without mutual connections within levels in such a manner that signals propagate only to a higher level, and a weight coefficient renewing means which renews values of weight coefficients of the output signal calculation means based on output signals obtained by the output signal calculating means;

each multiple-input single-output signal processor comprising a memory to store plural weight coefficients, an input section for inputting plural data, multiplying means to weight the input data from the input section by the weight coefficients stored in the memory, an adding means to add the plural data weighted by the multiplying means, and a threshold value processor to limit an output of the adding means to a value within a predetermined range; and the weight coefficient renewing means comprising a teacher signal generator to produce as a teacher signal a desirable value for the output signal of the output signal calculation means, an error signal calculation means to obtain an error between the output signal and the teacher signal, a steepest descent direction determination means to obtain a direction of steepest descent from an output of the error signal calculating means;

the weight coefficient renewing means further comprising an amount of weight change calculation means which calculates an amount of change in the weight coefficient from the direction of steepest descent, a conjugate gradient direction determination means to obtain a direction of the conjugate gradient from the direction of steepest descent, a linear search means which outputs amounts of weight change to plural learning rates for the direction of the conjugate gradient, a parabolic line approximation means which determines an amount of weight change by parabolic line approximation method from the plural weight change amounts output from the linear search means, a learning progress evaluation means which evaluates progress of learning from the error output by the error signal calculation means, a threshold value control means which gradually reduces a threshold value as learning progresses according to an evaluation result of the learning progress evaluation means, a first error signal evaluation means which evaluates whether the output of the error signal calculation means is less than the threshold value, a first amount of weight change control means which sets the amount of weight coefficient change to 0 when the error is determined to be less than the threshold value by the first error signal evaluation means, an amount of weight change selection means which selects either an output of an amount of weight change calculation means or an output of the parabolic line approximation means according to the level of the threshold value, and a weight modification means which changes the value of the weight coefficient stored in the memory according to an amount of weight change selected by the amount of weight change selection means.

4. A learning machine having an output signal calculation means comprising plural multiple-input single-output signal processors network connected in a hierarchical structure without mutual connections within levels in such a manner that signals propagate only to a higher level, and a weight coefficient renewing means which renews values of weight coefficients of the output signal calculation means based on output signals obtained by the output signal calculation means;

each multiple-input single-output signal processor comprising a memory to store plural weight coefficients, an input section for inputting plural data, multiplying means to weight the input data from the input section by the weight coefficients stored in the memory, an adding means to add the plural data weighted by the multiplying means, and a threshold value processor to limit an output of the adding means to a value within a predetermined range; and the weight coefficient renewing means comprising a teacher signal generator to produce as a teacher signal a desirable value for the output signal of the output signal calculation means, an error signal calculation means to obtain an error between the output signal and the teacher signal, a steepest descent direction determination means to obtain a direction of steepest descent from an output of the error signal calculating means;

the weight coefficient renewing means further comprising a conjugate gradient direction determination means to obtain a direction of a conjugate gradient from the direction of steepest descent, a learning progress evaluation means which evaluates progress of learning from the error output by the error signal calculation means, a threshold value control means which gradually reduces a threshold value as learning progresses according to an evaluation result of the learning progress evaluation means, a first error signal evaluation means which evaluates whether the output of the error signal calculation means is less than the threshold value, a skip evaluation means which counts the outputs of the first error signal evaluation means and outputs a skip signal when all output signals are less than the threshold value, a weight change direction selection means which selects either the direction of the conjugate gradient or the direction of the steepest descent as the direction of weight change according to the level of the threshold value, an amount of weight change calculation means which calculates an amount of change in the weight coefficient from the selected direction of weight change, a weight modification means which changes the value of the weight coefficient stored in the memory according to the output of the amount of weight change calculation means, and a weight change control means which causes the weight modification means to skip a weight change operation according to the skip signal.

5. A learning machine having an output signal calculation means comprising plural multiple-input single-output signal processors network connected in a hierarchical structure without mutual connections within levels in such a manner that signals propagate only to a higher level, and a weight coefficient renewing means which renews values of weight coefficients of the output signal calculation means based on output signals obtained by the output signal calculation means;

each multiple-input single-output signal processor comprising a memory to store plural weight coefficients, an input section for inputting plural data, multiplying means to weight the input data from the input section by the weight coefficients stored in the memory, an adding means to add the plural data weighted by the multiplying means, and a threshold value processor to limit an output of the adding means to a value within a predetermined range; and the weight coefficient renewing means comprising a teacher signal generator to produce as a teacher signal a desirable value for the output signal of the output signal calculation means, an error signal calculation means to obtain an error between the output signal and the teacher signal, a steepest descent direction determination means to obtain a direction of steepest descent from an output of the error signal calculation means;

the weight coefficient renewing means further comprising an amount of weight change calculation means which calculates an amount of change in the weight coefficient from the direction of steepest descent, a linear search means which outputs amounts of weight change to plural learning rates for the direction of steepest descent, a parabolic line approximation means which determines an amount of weight change by parabolic line approximation method from the plural weight change amounts output from the linear search means, a learning progress evaluation means which evaluates progress of learning from the error output by the error signal calculation means, a threshold value control means which gradually reduces the threshold value as learning progresses according to an evaluation result of the learning progress evaluation means, a first error signal evaluation means which evaluates whether the output of the error signal calculation means is less than the threshold value, a skip evaluation means which counts the outputs of the first error signal evaluation means and outputs a skip signal when all output signals are less than the threshold value, an amount of weight change selection means which selects either an output of the amount of weight change calculation means or an output of the parabolic line approximation means according to the level of the threshold value, a weight modification means which changes the value of the weight coefficient stored in the memory according to an amount of weight change selected by the amount of weight change selection means, and a weight change control means which causes the weight modification means to skip a weight change operation according to the skip signal.

6. A learning machine having an output signal calculation means comprising plural multiple-input single-output signal processors network connected in a hierarchical structure without mutual connections within levels in such a manner that signals propagate only to a higher level, and a weight coefficient renewing means which renews values of weight coefficients of the output signal calculation means based on output signals obtained by the output signal calculation means;

each multiple-input single-output signal processor comprising a memory to store plural weight coefficients, an input section for inputting plural data, multiplying means to weight the input data from the input section by the weight coefficients stored in the memory, an adding means to add the plural data weighted by the multiplying means, and a threshold value processor to limit an output of the adding means to a value within a predetermined range; and the weight coefficient renewing means comprising a teacher signal generator to produce as a teacher signal a desirable value for the output signal of the output signal calculation means, an error signal calculation means to obtain an error between the output signal and the teacher signal, a steepest descent direction determination means to obtain a direction of steepest descent from an output of the error signal calculation means;

the weight coefficient renewing means further comprising an amount of weight change calculation means which calculates an amount of change in the weight coefficient from the direction of steepest descent, a conjugate gradient direction determination means to obtain a direction of the conjugate gradient from the direction of steepest descent, a linear search means which outputs amounts of weight change to plural learning rates for the direction of the conjugate gradient, a parabolic line approximation means which determines an amount of weight change by parabolic line approximation method from the plural weight change amounts output from the linear search means, a learning progress evaluation means which evaluates progress of learning from the error output by the error signal calculation means, a threshold value control means which gradually reduces a threshold value as learning progresses according to an evaluation result of the learning progress evaluation means, a first error signal evaluation means which evaluates whether the output of the error signal calculation means is less than the threshold value, a skip evaluation means which counts outputs of the first error signal evaluation means and outputs a skip signal when all output signals are less than the threshold value, an amount of weight change selection means which selects either an output of the amount of weight change calculation means or an output of the parabolic line approximation means according to the level of the threshold value, a weight modification means which changes the value of the weight coefficient stored in the memory according to an amount of weight change selected by the amount of weight change selection means, and a weight change control means which causes the weight modification means to skip a weight change operation according to the skip signal.

* * * * *